United States Patent
Tohi et al.

(10) Patent No.: US 9,340,628 B2
(45) Date of Patent: May 17, 2016

(54) PROCESS FOR PRODUCING OLEFIN POLYMER

(71) Applicant: Mitsui Chemicals, Inc., Tokyo (JP)

(72) Inventors: Yasushi Tohi, Kawasaki (JP); Yasuhiro Hasada, Yamaguchi (JP); Hiroshi Noguchi, Singapore (SG)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/396,509

(22) PCT Filed: Apr. 23, 2013

(86) PCT No.: PCT/JP2013/061953
§ 371 (c)(1),
(2) Date: Oct. 23, 2014

(87) PCT Pub. No.: WO2013/161833
PCT Pub. Date: Oct. 31, 2013

(65) Prior Publication Data
US 2015/0094434 A1    Apr. 2, 2015

(30) Foreign Application Priority Data

Apr. 26, 2012 (JP) ................................. 2012-101600

(51) Int. Cl.
| | | |
|---|---|---|
| C08F 4/6592 | (2006.01) | |
| C08F 10/00 | (2006.01) | |
| C08F 2/06 | (2006.01) | |
| C08F 4/52 | (2006.01) | |
| C08F 4/659 | (2006.01) | |

(52) U.S. Cl.
CPC ............... *C08F 4/65922* (2013.01); *C08F 2/06* (2013.01); *C08F 4/52* (2013.01); *C08F 4/65908* (2013.01); *C08F 4/65927* (2013.01); *C08F 10/00* (2013.01)

(58) Field of Classification Search
CPC ............. C08F 4/65908; C08F 4/65812; C08F 4/6592; C08F 4/65927; C08F 10/00; C08F 2/06
See application file for complete search history.

(56) References Cited

U.S. PATENT DOCUMENTS

| | | | |
|---|---|---|---|
| 4,960,878 A | 10/1990 | Crapo et al. | |
| 4,990,640 A | 2/1991 | Tsutsui et al. | |
| 5,041,584 A | 8/1991 | Crapo et al. | |
| 5,369,196 A | 11/1994 | Matsumoto et al. | |
| 5,502,017 A | 3/1996 | Marks et al. | |
| 5,919,983 A | 7/1999 | Rosen et al. | |
| 6,291,609 B1 | 9/2001 | Crowther et al. | |
| 6,613,850 B1 | 9/2003 | Sato et al. | |
| 6,939,928 B1 | 9/2005 | Kawai et al. | |
| 7,795,194 B2 | 9/2010 | Iimura et al. | |
| 8,017,705 B2 | 9/2011 | Yamaguchi et al. | |
| 2004/0110631 A1 | 6/2004 | Rodriguez | |
| 2004/0242410 A1 | 12/2004 | Hanaoka et al. | |
| 2004/0254065 A1 | 12/2004 | Rodriquez et al. | |
| 2005/0049436 A1 | 3/2005 | Rodriguez et al. | |
| 2006/0116303 A1 | 6/2006 | Iimura et al. | |
| 2006/0161013 A1 | 7/2006 | Tohi et al. | |
| 2009/0054607 A1 | 2/2009 | Hanaoka et al. | |
| 2010/0048933 A1 | 2/2010 | Hanaoka et al. | |
| 2010/0069588 A1 | 3/2010 | Yamaguchi et al. | |
| 2012/0073631 A1* | 3/2012 | Ikenaga et al. | ................. 136/251 |
| 2013/0102745 A1 | 4/2013 | Yabukami et al. | |

FOREIGN PATENT DOCUMENTS

| | | |
|---|---|---|
| CN | 1782044 A | 6/2006 |
| CN | 1817837 A | 8/2006 |
| CN | 101189269 A | 5/2008 |
| CN | 101528784 A | 9/2009 |
| EP | 1 426 379 A1 | 6/2004 |
| EP | 1 900 758 A1 | 3/2008 |
| JP | 02-078687 A | 3/1990 |
| JP | 05-202125 A | 8/1993 |
| JP | 11-071410 A | 3/1999 |
| JP | 11-302312 A | 11/1999 |
| JP | 2000-507157 A | 6/2000 |
| JP | 2001-323010 A | 11/2001 |
| JP | 2002-505353 A | 2/2002 |
| JP | 2003-512515 A | 4/2003 |

(Continued)

OTHER PUBLICATIONS

Eiichi Kaji et al., "Development of New Modified Methylaluminoxanes," TOSOH Research & Technology Review, vol. 47 (2003), pp. 55-60.
Extended European Search Report dated May 27, 2015 issued in European Patent Application No. 13781228.5.
Office Action issued in Chinese Patent Application No. 201380022021.7 dated Oct. 13, 2015.

*Primary Examiner* — Caixia Lu
(74) *Attorney, Agent, or Firm* — Foley & Lardner LLP

(57) ABSTRACT

To provide a process for producing an olefin polymer, which makes it possible to use, as a solvent for use in the catalyst preparation and the like, an aliphatic hydrocarbon solvent instead of an aromatic hydrocarbon solvent causing large environmental burden, and which has good olefin polymerization activity. A process for producing an olefin polymer, characterized by having a step comprising feeding an olefin polymerization catalyst solution, which is obtained by mixing a metallocene compound, a compound that reacts with the metallocene compound to form an ion pair and at least one compound selected from an organoaluminum compound and an organoaluminum oxy compound with a saturated hydrocarbon solvent, to a polymerization reactor and solution-polymerizing an olefin in the polymerization reactor.

5 Claims, No Drawings

(56) References Cited

FOREIGN PATENT DOCUMENTS

| | | |
|---|---|---|
| JP | 2003-306510 A | 10/2003 |
| JP | 2004-513193 A | 4/2004 |
| JP | 2006-219683 A | 8/2006 |
| JP | 2010-248526 A | 11/2010 |
| JP | 2011-246559 A | 12/2011 |
| JP | 2012-092199 A | 5/2012 |
| JP | 2012-149188 A | 8/2012 |
| WO | WO-92/09640 A1 | 6/1992 |
| WO | WO-97/35893 A1 | 10/1997 |
| WO | WO-01/27124 A1 | 4/2001 |
| WO | WO-01/30785 A1 | 5/2001 |
| WO | WO-03/051892 A1 | 6/2003 |
| WO | WO-2004/029062 A1 | 4/2004 |
| WO | WO-2011/148968 A1 | 12/2011 |

* cited by examiner

PROCESS FOR PRODUCING OLEFIN POLYMER

CROSS REFERENCE TO RELATED APPLICATIONS

This application is the National Phase of PCT/JP2013/061953, filed Apr. 23, 2013, which claims priority to Japanese Application No. 2012-101600, filed Apr. 26, 2012.

TECHNICAL FIELD

The present invention relates to a process for producing an olefin polymer.

BACKGROUND ART

A large number of reports on using, as a catalyst system capable of producing an olefin polymer, a catalyst system combining a metallocene compound which is a transition metal compound, such as zirconocene, with an organoaluminum oxy compound (also referred to as "aluminoxane" hereinafter) or a catalyst system combining a metallocene compound with a compound which reacts with a metallocene compound to form an ion pair (also referred to as an "ionizing ionic compound" hereinafter), such as N,N-dimethylanilinium tetrakis(pentafluorophenyl)borate, have been already made.

Since the ionizing ionic compound has low solubility in aliphatic hydrocarbon solvents, it is usually used by dissolving it in aromatic hydrocarbon solvents such as toluene. However, aromatic hydrocarbon solvents are generally high-boiling, and therefore, there is a possibility of remaining of them in an olefin polymer obtained by polymerization. It is preferable that no aromatic hydrocarbon solvent remains in the olefin polymer from the viewpoints of odor and toxicity, but if a step of separating/removing the solvent is introduced into the production process, the cost is sometimes increased. In recent years, therefore, change of solvents for dissolving ionizing ionic compounds from aromatic hydrocarbon solvents to saturated hydrocarbon solvents, such as aliphatic hydrocarbon solvents or alicyclic hydrocarbon solvents, has been needed.

As one attempt to meet this need, increase in solubility of ionizing ionic compounds has been thought. Specifically, a technique of introducing a bulky substituent into an ionizing ionic compound, that is, a technique of introducing a bulky substituent to the anionic molecule side of an ionizing ionic compound (see, for example, patent literatures 1 to 4) or a technique of introducing a bulky substituent to the cationic molecule side of an ionizing ionic compound (see, for example, patent literatures 5 and 6), has been proposed. Moreover, a technique of improving a structure of an ionizing ionic compound itself (see, for example, patent literature 7) has been also proposed. However, these techniques are not industrially advantageous because the structure of the ionizing ionic compound becomes complicated.

CITATION LIST

Patent Literature

Patent literature 1: Japanese Translation of PCT International Application Publication No. 2002-505353
Patent literature 2: WO 03/051892
Patent literature 3: U.S. Publication No. 2004/0254065
Patent literature 4: U.S. Pat. No. 5,502,017
Patent literature 5: Japanese Translation of PCT International Application Publication No. 2000-507157
Patent literature 6: Japanese Translation of PCT International Application Publication No. 2003-512515
Patent literature 7: Japanese Translation of POT International Application Publication No. 2004-513193

SUMMARY OF INVENTION

Technical Problem

In order to avoid use of an aromatic hydrocarbon solvent, which is one of the aforesaid problems associated with the background art, an attempt to use an ionizing ionic compound in a suspended state in an aliphatic hydrocarbon solvent without dissolving it therein was made. In this case, however, olefin polymerization activity was sometimes low. The reason is assumed to be that since the ionizing ionic compound has low solubility in an aliphatic hydrocarbon solvent, formation of active sites due to the reaction of the metallocene compound with the ionizing ionic compound is slow or the ionizing ionic compound becomes heterogeneous. Further, it has become apparent that a polymer other than the desired polymer is produced during the polymerization of an olefin and therefore productivity is markedly deteriorated. The reason is assumed to be that prior to formation of active sites due to the reaction of the metallocene compound with the ionizing ionic compound, undesired polymerization has proceeded because of an active species formed by the metallocene compound and an aluminum compound that is used as a cocatalyst.

As a specific example, production of a polymer by a process comprising introducing an aliphatic hydrocarbon solvent in a polymerization reactor and continuously feeding, as catalyst components, a metallocene compound, an ionizing ionic compound and an aluminum compound, and as olefins, ethylene and butene, said process being a general process for continuous olefin polymerization, was carried out. In this case, there has been found a phenomenon that as the operation time is prolonged, a polymer having a higher ethylene content than the desired ethylene/butene copolymer is precipitated in the polymerization vessel and adheres to a wall of the polymerization vessel or a stirring blade to thereby make long-term continuous operation impossible.

In view of the aforesaid background art and the result of the above research, the problem to be solved by the present invention is to provide a process for producing an olefin polymer, which makes it possible to homogeneously dissolve catalyst components including an ionizing ionic compound in a saturated hydrocarbon solvent even if the saturated hydrocarbon solvent is used as a solvent for use in the catalyst preparation and the like instead of an aromatic hydrocarbon solvent causing large environmental burden, in addition, which has favorable olefin polymerization activity, and which can prevent adhesion of a polymer to a polymerization vessel wall or a stirring blade attributable to polymer precipitation to thereby realize continuous stable operation.

Solution to Problem

In order to solve the above problem, the present inventors have earnestly studied. As a result, they have found that the above problem can be solved by a process for producing an olefin polymer, which comprises feeding an olefin polymerization catalyst solution having the following constitution to a polymerization reactor, and they have accomplished the present invention.

That is to say, the process for producing an olefin polymer of the present invention is characterized by having a step comprising feeding an olefin polymerization catalyst solution, which is obtained by mixing (A) at least one metallocene compound selected from a compound represented by the general formula [A1] and a compound represented by the general formula [A2], (B) a compound which is a compound that reacts with the metallocene compound (A) to form an ion pair, and is represented by the general formula [B1], and (C) at least one compound selected from (C-1) an organoaluminum compound and (C-2) an organoaluminum oxy compound, with (D) a saturated hydrocarbon solvent under the following conditions (i) to (iv), to a polymerization reactor and solution-polymerizing an olefin in the polymerization reactor;

(i) the amount of the metallocene compound (A) added to 1 liter of the saturated hydrocarbon solvent (D) is 0.02 to 0.6 mmol, (ii) the molar ratio ((C)/(A)) of an aluminum atom in the compound (C) added to the saturated hydrocarbon solvent (D) to the metallocene compound (A) is 33 to 5000, (iii) the amount of an aluminum atom in the compound (C) added to 1 liter of the saturated hydrocarbon solvent (D) is 3 to 1000 mmol, and (iv) the molar ratio ((B)/(A)) of the compound (B) added to the saturated hydrocarbon solvent (D) to the metallocene compound (A) is 1 to 15;

[Chem. 1]

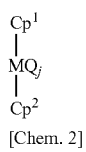

[A1]

[Chem. 2]

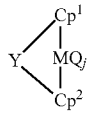

[A2]

wherein, in the formulas [A1] and [A2], M is an atom of the periodic table Group 4 or Group 5, Q is a halogen atom, a hydrocarbon group, a halogenated hydrocarbon group, a neutral conjugated or non-conjugated diene, an anionic ligand or a neutral ligand capable of being coordinated with a lone electron pair, j is an integer of 1 to 4, when j is an integer of 2 or greater, plural Q may be the same as or different from each other, and $Cp^1$ and $Cp^2$ may be the same as or different from each other and are each a cyclopentadienyl group or a substituted cyclopentadienyl group capable of forming a sandwich structure together with M; and Y in the formula [A2] is a divalent hydrocarbon group of 1 to 30 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —$SO_2$—, —Ge—, —Sn—, —$NR^a$—, —$P(R^a)$—, —P(O) ($R^a$)—, —$BR^a$— or —$AlR^a$— (wherein $R^a$ is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to a nitrogen atom);

[Chem. 3]

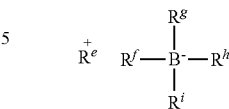

[B1]

wherein, in the formula [B1], $R^{e+}$ is carbenium cation, and $R^f$ to $R^i$ are each independently a hydrocarbon group of 1 to 20 carbon atoms or a halogenated hydrocarbon group of 1 to 20 carbon atoms.

In the present invention, the compound (C) is preferably a compound represented by the general formula [C1]:

[Chem. 4]

$AlR_3$  [C1]

wherein, in the formula [C1], R is a straight-chain or branched alkyl group of 3 to 10 carbon atoms.

In the present invention, the metallocene compound (A) is preferably a compound represented by the general formula [A3]:

[Chem. 5]

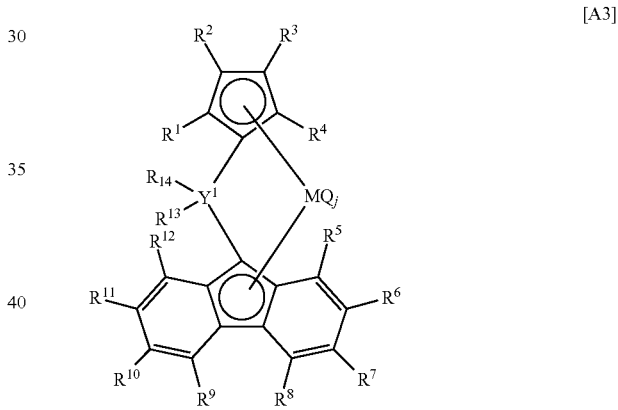

[A3]

wherein, in the formula [A3] $R^1$, $R^2$, $R^3$, $R^4$, $R^5$, $R^8$, $R^9$ and $R^{12}$ are each independently a hydrogen atom, a hydrocarbon group, a silicon-containing group or a hetero atom-containing group other than a silicon-containing group, and neighboring two groups of $R^1$ to $R^4$ may be bonded to each other to form a ring;

$R^6$ and $R^{11}$ are the same atoms or the same groups selected from hydrogen atoms, hydrocarbon groups, silicon-containing groups and hetero atom-containing groups other than silicon-containing groups, $R^7$ and $R^{10}$ are the same atoms or the same groups selected from hydrogen atoms, hydrocarbon groups, silicon-containing groups and hetero atom-containing groups other than silicon-containing groups, $R^6$ and $R^7$ may be bonded to each other to form a ring, and $R^{10}$ and $R^{11}$ may be bonded to each other to form a ring, with the proviso that there is no case where all of $R^6$, $R^7$, $R^{10}$ and $R^{11}$ are hydrogen atoms;

$R^{13}$ and $R^{14}$ are each independently an alkyl group or an aryl group, and $R^{13}$ and $R^{14}$ may be bonded to each other to form a ring;

M is a titanium atom, a zirconium atom or a hafnium atom;

$Y^1$ is a carbon atom or a silicon atom; and

Q is a halogen atom, a hydrocarbon group, a halogenated hydrocarbon group, a neutral conjugated or non-conjugated diene of 4 to 20 carbon atoms, an anionic ligand or a neutral ligand capable of being coordinated with a lone electron pair, j is an integer of 1 to 4, and when j is an integer of 2 or greater, plural Q may be the same as or different from each other.

The saturated hydrocarbon solvent (D) is preferably at least one hydrocarbon solvent selected from an aliphatic hydrocarbon solvent and an alicyclic hydrocarbon solvent.

The reaction solvent for use in the solution polymerization is preferably at least one hydrocarbon solvent selected from an aliphatic hydrocarbon solvent and an alicyclic hydrocarbon solvent.

Advantageous Effects of Invention

According to the present invention, there can be provided a process for producing an olefin polymer, which makes it possible to use, as a solvent for use in the catalyst preparation and the like (particularly, solvent for dissolving active species of catalyst), a saturated hydrocarbon solvent, such as an aliphatic hydrocarbon solvent or an alicyclic hydrocarbon solvent, instead of an aromatic hydrocarbon solvent causing large environmental burden, in addition, which has favorable olefin polymerization activity, and which can prevent remaining of an aromatic hydrocarbon solvent in the resulting polymer and can also prevent adhesion of a polymer to a polymerization vessel wall or a stirring blade attributable to polymer precipitation to thereby realize continuous stable operation.

DESCRIPTION OF EMBODIMENTS

The process for producing an olefin polymer of the present invention has a step of solution-polymerizing an olefin using an olefin polymerization catalyst solution obtained by a specific preparation process. The olefin polymerization catalyst solution is described below, and then, the process for producing an olefin polymer of the present invention is described.

[Olefin Polymerization Catalyst Solution]

The olefin polymerization catalyst solution for use in the present invention is obtained by mixing a metallocene compound (A), a specific compound (B) which reacts with the metallocene compound (A) to form an ion pair and a specific aluminum compound (C) with a saturated hydrocarbon solvent (D), and is obtained as a solution in which the above components are each dissolved in a specific ratio.

The above components are also referred to as "components (A) to (C)" hereinafter. In the olefin polymerization catalyst solution, additives other than the components (A) to (C) may be contained within limits not detrimental to the object of the present invention.

In the present invention, the "olefin polymerization catalyst solution" indicates a solution in which the components (A) to (C) are dissolved in the saturated hydrocarbon solvent (D). This solution is preferably a solution in which the components (A) to (C) added to the saturated hydrocarbon solvent (D) are completely dissolved, but the concept of this term includes also a supernatant portion in a situation where apart of the components (A) to (C) remain undissolved.

<Metallocene Compound (A)>

In the present invention, the metallocene compound (A) is at least one metallocene compound selected from a compound represented by the general formula [A1] (non-crosslinked metallocene compound) and a compound represented by the general formula [A2] (crosslinked metallocene compound).

[Chem. 6]

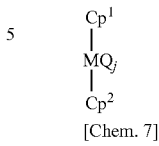

[A1]

[Chem. 7]

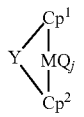

[A2]

In the formulas [A1] and [A2], M is an atom of the periodic table Group 4 or Group 5. Specific examples of M include titanium atom, zirconium atom, hafnium atom, vanadium atom, niobium atom and tantalum atom, and preferable are titanium atom, zirconium atom and hafnium atom.

In the formulas [A1] and [A2], Q is a halogen atom, a hydrocarbon group, a halogenated hydrocarbon group (that is, a group wherein at least one hydrogen atom of the hydrocarbon group is replaced with a halogen atom), a neutral conjugated or non-conjugated diene, an anionic ligand or a neutral ligand capable of being coordinated with a lone electron pair.

Examples of the halogen atoms include fluorine, chlorine, bromine and iodine.

Examples of the hydrocarbon groups include straight-chain or branched aliphatic hydrocarbon groups of 1 to 30 carbon atoms, preferably 1 to 20 carbon atoms, more preferably 1 to 10 carbon atoms; alicyclic hydrocarbon groups of 3 to 30 carbon atoms, preferably 3 to 20 carbon atoms, more preferably 3 to 10 carbon atoms; and aromatic hydrocarbon groups of 6 to 30 carbon atoms, preferably 6 to 20 carbon atoms, more preferably 6 to 10 carbon atoms.

Examples of the aliphatic hydrocarbon groups include straight-chain or branched alkyl groups of 1 to 30 carbon atoms, preferably 1 to 20 carbon atoms, more preferably 1 to 10 carbon atoms, such as methyl group, ethyl group, n-propyl group, n-butyl group, n-pentyl group, n-hexyl group, isopropyl group, isobutyl group, sec-butyl group, t-butyl group, neopentyl group, 1,1-dimethylpropyl group, 1,1-diethylpropyl group, 1-ethyl-1-methylpropyl group, 1,1,2,2-tetramethylpropyl group, 1,1-dimethylbutyl group and 1,1,3-trimethylbutyl group; straight-chain or branched alkenyl groups of 2 to 30 carbon atoms, preferably 2 to 20 carbon atoms, more preferably 2 to 10 carbon atoms, such as vinyl group, allyl group and isopropenyl group; and straight-chain or branched alkynyl groups of 2 to 30 carbon atoms, preferably 2 to 20 carbon atoms, more preferably 2 to 10 carbon atoms, such as ethynyl group and propargyl group.

Examples of the alicyclic hydrocarbon groups include cyclic saturated hydrocarbon groups of 3 to 30 carbon atoms, preferably 3 to 20 carbon atoms, more preferably 3 to 10 carbon atoms, such as cyclopropyl group, cyclobutyl group, cyclopentyl group, cyclohexyl group, 1-methyl-1-cyclohexyl group and adamantyl group; and cyclic unsaturated hydrocarbon groups of 5 to 30 carbon atoms, such as cyclopentadienyl group, indenyl group and fluorenyl group.

Examples of the aromatic hydrocarbon groups include aryl groups, e.g., unsubstituted aryl groups of 6 to 30 carbon atoms, preferably 6 to 20 carbon atoms, more preferably 6 to 10 carbon atoms, such as phenyl group, naphthyl group, biphenyl group, terphenyl group, phenanthryl group and anthracenyl group; and alkyl group-substituted aryl groups, such as tolyl group, dimethylphenyl group, isopropylphenyl group, t-butylphenyl group and di-t-butylphenyl group.

In the hydrocarbon group, at least one hydrogen atom may be replaced with another hydrocarbon group. Examples of the hydrocarbon groups in which at least one hydrogen atom is replaced with another hydrocarbon group include aryl group-substituted alkyl groups, such as benzyl group and cumyl group, and cyclic saturated hydrocarbon group-substituted alkyl groups, such as cyclohexylmethyl group.

Examples of the halogenated hydrocarbon groups include halogenated hydrocarbon groups of 1 to 30 carbon atoms, preferably 1 to 20 carbon atoms, more preferably 1 to 10 carbon atoms, such as trifluoromethyl group, pentafluorophenyl group and chlorophenyl group.

The neutral conjugated or non-conjugated diene is, for example a neutral conjugated or non-conjugated diene of 4 to 20 carbon atoms. Specific examples thereof include s-cis- or s-trans-$\eta$4-1,3-butadiene, s-cis- or s-trans-$\eta$4-1,4-diphenyl-1,3-butadiene, s-cis- or s-trans-$\eta$4-3-methyl-1,3-pentadiene, s-cis- or s-trans-$\eta$4-1,4-dibenzyl-1,3-butadiene, s-cis- or s-trans-$\eta$4-2,4-hexadiene, s-cis- or s-trans-$\eta$4-1,3-pentadiene, s-cis- or s-trans-$\eta$4-1,4-ditolyl-1,3-butadiene and s-cis- or s-trans-$\eta$4-1,4-bis(trimethylsilyl)-1,3-butadiene.

Examples of the anionic ligands include alkoxy groups, such as methoxy and tert-butoxy; aryloxy groups, such as phenoxy; carboxylate groups, such as acetate and benzoate; and sulfonate groups, such as mesylate and tosylate.

Examples of the neutral ligands capable of being coordinated with a lone electron pair include organophosphorus compounds, such as trimethylphosphine, triethylphosphine, triphenylphosphine and diphenylmethylphosphine; and ethers, such as tetrahydrofuran, dioxane, diethyl ether and 1,2-dimethoxyethane.

In the formulas [A1] and [A2], j is in integer of 1 to 4, preferably an integer of 2 to 4, more preferably 2 or 3. When j is an integer of 2 or greater, plural Q may be the same as or different from each other.

In the formulas [A1] and [A2], $Cp^1$ and $Cp^2$ may be the same as or different from each other and are each a cyclopentadienyl group or a substituted cyclopentadienyl group capable of forming a sandwich structure together with M. The substituted cyclopentadienyl group is a group wherein at least one hydrogen atom of a cyclopentadienyl group is replaced with a substituent.

The substituent in the substituted cyclopentadienyl group is, for example, a hydrocarbon group (preferably hydrocarbon group of 1 to 20 carbon atoms; sometimes also referred to as "hydrocarbon group (f1)" hereinafter) or a silicon-containing group (preferably silicon-containing group of 1 to 20 carbon atoms; sometimes also referred to as "silicon-containing group (f2)" hereinafter). As other substituents in the substituted cyclopentadienyl group, hetero atom-containing groups (except the silicon-containing group (f2)), such as halogenated hydrocarbon group, oxygen-containing group and nitrogen-containing group, can be also mentioned.

The hydrocarbon group (f1) is preferably a hydrocarbon group of 1 to 20 carbon atoms, and examples thereof include straight-chain or branched hydrocarbon groups (e.g., alkyl group, alkenyl group, alkynyl group), cyclic saturated hydrocarbon groups (e.g., cycloalkyl group) and cyclic unsaturated hydrocarbon groups (e.g., aryl group). In the hydrocarbon groups (f1), groups wherein arbitrary two hydrogen atoms bonded to carbon atoms adjacent to each other are replaced at the same time to form an alicyclic ring or an aromatic ring in the above groups given as examples are also included.

Specific examples of the hydrocarbon groups (f1) include straight-chain aliphatic hydrocarbon groups, such as methyl group, ethyl group, n-propyl group, n-butyl group, n-pentyl group, n-hexyl group, n-heptyl group, n-octyl group, n-nonyl group, n-decanyl group and allyl group; branched aliphatic hydrocarbon groups, such as isopropyl group, isobutyl group, sec-butyl group, t-butyl group, amyl group, 3-methylpentyl group, neopentyl group, 1,1-diethylpropyl group, 1,1-dimethylbutyl group, 1-methyl-1-propylbutyl group, 1,1-propylbutyl group, 1,1-dimethyl-2-methylpropyl group and 1-methyl-1-isopropyl-2-methylpropyl group; cyclic saturated hydrocarbon groups, such as cyclopentyl group, cyclohexyl group, cycloheptyl group, cyclooctyl group, norbornyl group and adamantyl group; cyclic unsaturated hydrocarbon groups, such as phenyl group, naphthyl group, biphenyl group, phenanthryl group and anthracenyl group, and nucleus alkyl-substituted groups thereof; and groups wherein at least one hydrogen atom of saturated hydrocarbon groups is replaced with an aryl group, such as benzyl group and cumyl group.

The silicon-containing group (f2) is preferably a silicon-containing group of 1 to 20 carbon atoms. For example, a group wherein a silicon atom is directly covalent-bonded to ring carbon of a cyclopentadienyl group can be mentioned, and specific examples thereof include alkylsilyl groups (e.g., trimethylsilyl group) and arylsilyl groups (e.g., triphenylsilyl group).

Specific examples of the hetero atom-containing groups (except the silicon-containing group (f2)) include methoxy group, ethoxy group, phenoxy group, N-methylamino group, trifluoromethyl group, tribromomethyl group, pentafluoroethyl group and pentafluorophenyl group.

Of the hydrocarbon groups (f1), straight-chain or branched aliphatic hydrocarbon groups of 1 to 20 carbon atoms, specifically methyl group, ethyl group, n-propyl group, n-butyl group, n-hexyl group, isopropyl group, isobutyl group, sec-butyl group, t-butyl group, neopentyl group, etc., can be given as preferred examples.

The substituted cyclopentadienyl groups also include indenyl group, fluorenyl group, azulenyl group and groups wherein one or more hydrogen atoms of these groups are replaced with the above hydrocarbon groups, and in the case of the indenyl group, the fluorenyl group and the azulenyl group, a part or all of double bonds of an unsaturated ring condensed with a cyclopentadienyl group may be hydrogenated.

In the formula [A2], Y is a divalent hydrocarbon group of 1 to 30 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn (tin)-, —NR$^a$—, —P(R$^a$)—, —P(O)(R$^a$)—, —BR$^a$— or —AlR$^a$—. R$^a$ is a hydrocarbon group of 1 to 20 carbon atoms, a halogenated hydrocarbon group of 1 to 20 carbon atoms, a hydrogen atom, a halogen atom or a nitrogen compound residue (—NRH or —NR$_2$ wherein R is a hydrocarbon group of 1 to 20 carbon atoms) in which one or two hydrocarbon groups of 1 to 20 carbon atoms are bonded to a nitrogen atom.

As the metallocene compound (A), a compound represented by the general formula (A2) is preferable, and such a crosslinked metallocene compound represented by the general formula (1) (also referred to as a "crosslinked metallocene compound [A3]" hereinafter) as disclosed in WO 01/27124 is more preferable.

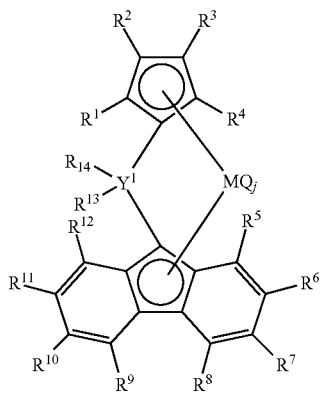

[Chem. 8] [A3]

The crosslinked metallocene compound [A3] has the following structural features [m1] to [m3].

[m1] Of two ligands, one is a cyclopentadienyl group which may have a substituent, and the other is a fluorenyl group which may have a substituent.

[m2] Two ligands are bonded by a covalent-bonding crosslinking portion (also referred to as a "crosslinking portion" hereinafter) constituted of a carbon atom or a silicon atom.

[m3] The transition metal (M) to constitute the metallocene compound is an atom of the periodic table Group 4, specifically titanium atom, zirconium atom or hafnium atom.

The cyclopentadienyl group, the fluorenyl group, the crosslinking portion and other features of the crosslinked metallocene compound [A3] will be described in order hereinafter.

(Cyclopentadienyl Group)

In the formula [A3], $R^1$, $R^2$, $R^3$ and $R^4$ are each independently a hydrogen atom, a hydrocarbon group, a silicon-containing group or a hetero atom-containing group other than a silicon-containing group, they are each independently preferably a hydrogen atom, a hydrocarbon group or a silicon-containing group, and neighboring two groups of them may be bonded to each other to form a ring.

For example, $R^1$, $R^2$, $R^3$ and $R^4$ are all hydrogen atoms, or one or more of $R^1$, $R^2$, $R^3$ and $R^4$ are hydrocarbon groups (preferably hydrocarbon groups of 1 to 20 carbon atoms) or silicon-containing groups (preferably silicon-containing groups of 1 to 20 carbon atoms). In addition, hetero atom-containing groups, such as halogenated hydrocarbon group, oxygen-containing group and nitrogen-containing group, can be also mentioned.

When two or more of $R^1$, $R^2$, $R^3$ and $R^4$ are substituents other than hydrogen atom, the substituents may be the same as or different from each other, and neighboring two groups of $R^1$, $R^2$, $R^3$ and $R^4$ may be bonded to each other to form an alicyclic ring or an aromatic ring.

As examples of the hydrocarbon groups in $R^1$ to $R^4$ and preferred groups of them, the hydrocarbon groups (f1) defined at the place of the aforesaid substituted cyclopentadienyl group can be mentioned. As examples of the silicon-containing groups in $R^1$ to $R^4$ and preferred groups of them, the silicon-containing groups (f2) defined at the place of the aforesaid substituted cyclopentadienyl group can be mentioned. As the hetero atom-containing groups in $R^1$ to $R^4$, the groups given as examples at the place of the aforesaid substituted cyclopentadienyl group can be mentioned.

(Fluorenyl Group)

In the formula [A3], $R^5$, $R^8$, $R^9$ and $R^{12}$ are each independently a hydrogen atom, a hydrocarbon group, a silicon-containing group or a hetero atom-containing group other than a silicon-containing group, and they are each independently preferably a hydrogen atom, a hydrocarbon group or a silicon-containing group. $R^6$ and $R^{11}$ are the same atoms or the same groups selected from hydrogen atoms, hydrocarbon groups, silicon-containing groups and hetero atom-containing groups other than silicon-containing groups, and preferable are hydrogen atoms, hydrocarbon groups and silicon-containing groups. $R^7$ and $R^{10}$ are the same atoms or the same groups selected from hydrogen atoms, hydrocarbon groups, silicon-containing groups and hetero atom-containing groups other than silicon-containing groups, and preferable are hydrogen atoms, hydrocarbon groups and silicon-containing groups. $R^6$ and $R^7$ may be bonded to each other to form a ring, and $R^{10}$ and $R^{11}$ may be bonded to each other to form a ring.

From the viewpoint of polymerization activity, it is preferable that none of $R^6$ and $R^{11}$ are hydrogen atoms or none of $R^7$ and $R^{10}$ are hydrogen atoms, and it is more preferable that none of $R^6$, $R^7$, $R^{10}$ and $R^{11}$ are hydrogen atoms. It is particularly preferable that $R^6$ and $R^{11}$ are the same groups selected from hydrocarbon groups and silicon-containing groups or $R^7$ and $R^{10}$ are the same groups selected from hydrocarbon groups and silicon-containing groups. It is most preferable that $R^6$ and $R^7$ are bonded to each other to form an alicyclic ring or an aromatic ring and $R^{10}$ and $R^{11}$ are bonded to each other to form an alicyclic ring or an aromatic ring.

As examples of the hydrocarbon groups in $R^5$ to $R^{12}$ and preferred groups of them, the hydrocarbon groups (f1) defined at the place of the aforesaid substituted cyclopentadienyl group can be mentioned. As examples of the silicon-containing groups in $R^5$ to $R^{12}$ and preferred groups of them, the silicon-containing groups (f2) defined at the place of the aforesaid substituted cyclopentadienyl group can be mentioned. As the hetero atom-containing groups in $R^5$ to $R^{12}$, the groups given as examples at the place of the aforesaid substituted cyclopentadienyl group can be mentioned.

When $R^6$ and $R^7$ ($R^{10}$ and $R^{11}$) are bonded to each other to form an alicyclic ring or an aromatic ring, preferred examples of the substituted fluorenyl groups include groups derived from the later-described compounds represented by the general formulas [I] to [V].

(Crosslinking Portion)

In the formula [A3], $R^{13}$ and $R^{14}$ are each independently an alkyl group or an aryl group, and $Y^1$ is a carbon atom or a silicon atom. To the crosslinking atom $Y^1$ of the crosslinking portion, alkyl groups or aryl groups [$R^{13}$ and $R^{14}$] which may be the same as or different from each other are bonded. Further, $R^{13}$ and $R^{14}$ may be bonded to each other to form a ring structure.

As the alkyl groups, the hydrocarbon groups (f1) defined at the place of the aforesaid substituted cyclopentadienyl group can be mentioned. When $Y^1$ is a carbon atom, the ring structure formed by bonding of $R^{13}$ and $R^{14}$ to each other is a cyclohexyl group, a cyclopentyl group or the like. Examples of the aryl groups include phenyl group, naphthyl group, anthracenyl group and groups wherein one or more of aromatic hydrogen atoms (sp2 type hydrogen atoms) of these groups are replaced with substituents. As the substituents, the hydrocarbon groups (f1) and the silicon-containing groups (f2) defined at the place of the aforesaid substituted cyclopentadienyl group, a halogen atom and a halogenated hydrocarbon group can be mentioned.

Specific examples of the aryl groups include unsubstituted aryl groups of 6 to 14 carbon atoms, preferably 6 to 10 carbon atoms, such as phenyl group, naphthyl group, anthracenyl group and biphenyl group; alkyl group-substituted aryl groups, such as tolyl group, dimethylphenyl group, isopropylphenyl group, n-butylphenyl group and t-butylphenyl group; cycloalkyl group-substituted aryl groups, such as cyclohexylphenyl group; halogenated aryl groups, such as chlorophenyl group, bromophenyl group, dichlorophenyl group and dibromophenyl group; and halogenated alkyl group-substituted aryl groups, such as (trifluoromethyl)phenyl group and bis(trifluoromethyl)phenyl group. The substituent is preferably located at the meta-position and/or the para-position. Of the above groups, a substituted phenyl group wherein the substituent is located at the meta-position and/or the para-position is more preferable.

(Other Features of Crosslinked Metallocene Compound)

In the formula [A3], Q is a halogen atom, a hydrocarbon group, a halogenated hydrocarbon group, a neutral conjugated or non-conjugated diene of 4 to 20 carbon atoms, an anionic ligand or a neutral ligand capable of being coordinated with a lone electron pair, j is an integer of 1 to 4, and when j is an integer of 2 or greater, plural Q may be the same as or different from each other.

As the halogen atom, the hydrocarbon group, the halogenated hydrocarbon group, the neutral conjugated or non-conjugated diene of 4 to 20 carbon atoms, the anionic ligand or the neutral ligand capable of being coordinated with a lone electron pair, each being represented by Q, the same atom or group as that for Q in the formulas [A1] and [A2] can be mentioned.

(Examples of Preferred Crosslinked Metallocene Compounds [A3])

Specific examples of the crosslinked metallocene compounds [A3] are given below, but the scope of the present invention is not particularly limited by them. In the exemplary compounds, octamethyloctahydrodibenzofluorenyl indicates a group derived from a compound having a structure represented by the formula [I], octamethyltetrahydrodicyclopentafluorenyl indicates a group derived from a compound having a structure represented by the formula [II], dibenzofluorenyl indicates a group derived from a compound having a structure represented by the formula [III], 1,1',3,6,8,8'-hexamethyl-2,7-dihydrodicyclopentafluorenyl indicates a group derived from a compound having a structure represented by the formula [IV], and 1,3,3',6,6',8-hexamethyl-2,7-dihydrodicylopentafluorenyl indicates a group derived from a compound having a structure represented by the formula [V].

[Chem. 9]

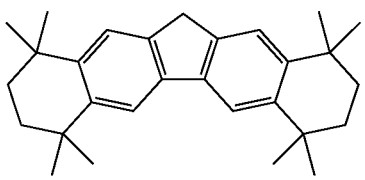
[I]

[Chem. 10]

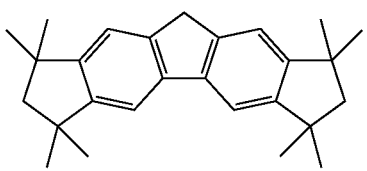
[II]

[Chem. 11]

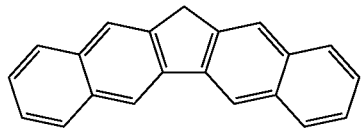
[III]

[Chem. 12]

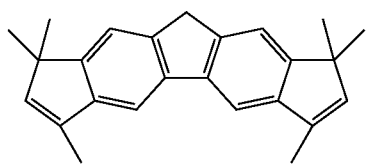
[IV]

[Chem. 13]

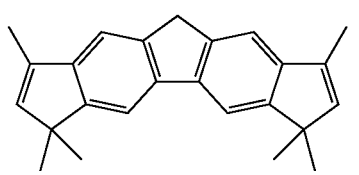
[V]

Examples of the crosslinked metallocene compounds [A3] include
dimethylmethylene(cyclopentadienyl)(3,6-dimethylfluorenyl)zirconium dichloride,
dimethylmethylene(cyclopentadienyl)(3,6-diisopropylfluorenyl)zirconium dichloride,
dimethylmethylene(cyclopentadienyl)(3,6-di-tert-butylfluorenyl)zirconium dichloride,
dimethylmethylene(cyclopentadienyl)(3,6-dicyclohexylfluorenyl)zirconium dichloride,
dimethylmethylene(cyclopentadienyl)(3,6-diphenylfluorenyl)zirconium dichloride,
dimethylmethylene(cyclopentadienyl)[3,6-di(trimethylsilyl)fluorenyl]zirconium dichloride,
dimethylmethylene(cyclopentadienyl)(2,7-dimethylfluorenyl)zirconium dichloride,
dimethylmethylene(cyclopentadienyl)(2,7-diisopropylfluorenyl)zirconium dichloride,
dimethylmethylene(cyclopentadienyl)(2,7-di-tert-butylfluorenyl)zirconium dichloride,
dimethylmethylene(cyclopentadienyl)(2,7-dicyclohexylfluorenyl)zirconium dichloride,
dimethylmethylene(cyclopentadienyl)(2,7-diphenylfluorenyl)zirconium dichloride,
dimethylmethylene(cyclopentadienyl)[3,6-di(trimethylsilyl)fluorenyl]zirconium dichloride,
dimethylmethylene(cyclopentadienyl)(1,3,6,8-tetramethylfluorenyl)zirconium dichloride,
dimethylmethylene(cyclopentadienyl)(3,6-diisopropyl-1,8-dimethylfluorenyl)zirconium dichloride,
dimethylmethylene(cyclopentadienyl)(3,6-di-tert-butyl-1,8-dimethylfluorenyl)zirconium dichloride,
dimethylmethylene(cyclopentadienyl)(3,6-dicyclohexyl-1,8-dimethylfluorenyl)zirconium dichloride,
dimethylmethylene(cyclopentadienyl)(3,6-diphenyl-1,8-dimethylfluorenyl)zirconium dichloride,
dimethylmethylene(cyclopentadienyl)[3,6-di(trimethylsilyl)-1,8-dimethylfluorenyl]zirconium dichloride,
dimethylmethylene(cyclopentadienyl)(2,3,6,7-tetramethylfluorenyl)zirconium dichloride, dimethylmethylene(cyclopentadienyl)(3,6-diisopropyl-2,7-dimethylfluorenyl)zirconium dichloride,
dimethylmethylene(cyclopentadienyl)(3,6-di-tert-butyl-2,7-dimethylfluorenyl)zirconium dichloride,
dimethylmethylene(cyclopentadienyl)(3,6-dicyclohexyl-2,7-dimethylfluorenyl)zirconium dichloride,
dimethylmethylene(cyclopentadienyl)(3,6-diphenyl-2,7-dimethylfluorenyl)zirconium dichloride,
dimethylmethylene(cyclopentadienyl)[3,6-di(trimethylsilyl)-2,7-dimethylfluorenyl]zirconium dichloride,
cyclopentylidene(cyclopentadienyl)(octamethyloctahydrodibenzofluorenyl)zirconium dichloride,
cyclohexylidene(cyclopentadienyl)(octamethyloctahydrodibenzofluorenyl)zirconium dichloride,
adamantylidene(cyclopentadienyl)(octamethyloctahydrodibenzofluorenyl)zirconium dichloride,
monophenylmonomethylmethylene(cyclopentadienyl)(octamethyloctahydrodibenzofluorenyl)zirconium dichloride,
dimethylmethylene(cyclopentadienyl)(octamethyloctahydrodibenzofluorenyl)zirconium dichloride,
cyclopentylidene(cyclopentadienyl)(octamethyltetrahydrodicyclopentafluorenyl)zirconium dichloride,
cyclohexylidene(cyclopentadienyl)(octamethyltetrahydrodicyclopentafluorenyl)zirconium dichloride,
adamantylidene(cyclopentadienyl)(octamethyltetrahydrodicyclopentafluorenyl)zirconium dichloride,
monophenylmonomethylmethylene(cyclopentadienyl)(octamethyltetrahydrodicyclopentafluorenyl)zirconium dichloride,
dimethylmethylene(cyclopentadienyl)(octamethyltetrahydrodicyclopentafluorenyl)zirconium dichloride,
diethylmethylene(cyclopentadienyl)(octamethyltetrahydrodicyclopentafluorenyl)zirconium dichloride,
cyclopentylidene(cyclopentadienyl)(dibenzofluorenyl)zirconium dichloride,
cyclohexylidene(cyclopentadienyl)(dibenzofluorenyl)zirconium dichloride,
adamantylidene(cyclopentadienyl)(dibenzofluorenyl)zirconium dichloride,
monophenylmonomethylmethylene(cyclopentadienyl)(dibenzofluorenyl)zirconium dichloride,
dimethylmethylene(cyclopentadienyl)(dibenzofluorenyl)zirconium dichloride,
diethylmethylene(cyclopentadienyl)(dibenzofluorenyl)zirconium dichloride,
diphenylmethylene(cyclopentadienyl)(2,7-di-tert-butylfluorenyl)zirconium dichloride,
diphenylmethylene(cyclopentadienyl)(3,6-di-tert-butylfluorenyl)zirconium dichloride,
diphenylmethylene(cyclopentadienyl)(octamethyloctahydrodibenzofluorenyl)zirconium dichloride,
diphenylmethylene(cyclopentadienyl)(octamethyltetrahydrodicyclopentafluorenyl)zirconium dichloride,
diphenylmethylene(cyclopentadienyl)(dibenzofluorenyl)zirconium dichloride,
diphenylmethylene(cyclopentadienyl)(1,1',3,6,8,8'-hexamethyl-2,7-dihydrodicylopentafluorenyl)zirconium dichloride,
diphenylmethylene(cyclopentadienyl)(1,3,3',6,6'8-hexamethyl-2,7-dihydrodicylopentafluorenyl)zirconium dichloride,
diphenylmethylene(cyclopentadienyl)(2,7-diphenyl-3,6-di-tert-butylfluorenyl)zirconium dichloride,
diphenylmethylene(cyclopentadienyl)(2,7-dimethyl-3,6-di-tert-butylfluorenyl)zirconium dichloride,
diphenylmethylene(cyclopentadienyl)(2,7-(trimethylphenyl)-3,6-di-tert-butylfluorenyl)zirconium dichloride,
diphenylmethylene(cyclopentadienyl)(2,7-(dimethylphenyl)-3,6-di-tert-butylfluorenyl)zirconium dichloride,
diphenylmethylene(cyclopentadienyl)(2,3,6,7-tetra-tert-butylfluorenyl)zirconium dichloride,
di(p-tolyl)methylene(cyclopentadienyl)(2,7-di-tert-butylfluorenyl)zirconium dichloride,
di(p-tolyl)methylene(cyclopentadienyl)(3,6-di-tert-butylfluorenyl)zirconium dichloride,
di(p-tolyl)methylene(cyclopentadienyl)(octamethyloctahydrodibenzofluorenyl)zirconium dichloride,
di(p-tolyl)methylene(cyclopentadienyl)(octamethyltetrahydrodicyclopentafluorenyl)zirconium dichloride,
di(p-tolyl)methylene(cyclopentadienyl)(dibenzofluorenyl)zirconium dichloride,
di(p-tolyl)methylene(cyclopentadienyl)(1,1',3,6,8,8'-hexamethyl-2,7-dihydrodicyclopentafluorenyl)zirconium dichloride,
di(p-tolyl)methylene(cyclopentadienyl)(1,3,3',6,6',8-hexamethyl-2,7-dihydrodicyclopentafluorenyl)zirconium dichloride,
di(p-tolyl)methylene(cyclopentadienyl)(2,7-diphenyl-3,6-di-tert-butylfluorenyl)zirconium dichloride,
di(p-tolyl)methylene(cyclopentadienyl)(2,7-dimethyl-3,6-di-tert-butylfluorenyl)zirconium dichloride,
di(p-tolyl)methylene(cyclopentadienyl)(2,7-(trimethylphenyl)-3,6-di-tert-butylfluorenyl)zirconium dichloride,
di(p-tolyl)methylene(cyclopentadienyl)(2,7-(dimethylphenyl)-3,6-di-tert-butylfluorenyl)zirconium dichloride,
di(p-tolyl)methylene(cyclopentadienyl)(2,3,6,7-tetramethylfluorenyl)zirconium dichloride,
di(p-tolyl)methylene(cyclopentadienyl)(2,3,6,7-tetra-tert-butylfluorenyl)zirconium dichloride,
di(p-chlorophenyl)methylene(cyclopentadienyl)(2,7-di-tert-butylfluorenyl)zirconium dichloride,
di(p-chlorophenyl)methylene(cyclopentadienyl)(3,6-di-tert-butylfluorenyl)zirconium dichloride,
di(p-chlorophenyl)methylene(cyclopentadienyl)(octamethyloctahydrodibenzofluorenyl)zirconium dichloride,
di(p-chlorophenyl)methylene(cyclopentadienyl)(octamethyltetrahydrodicyclopentafluorenyl)zirconium dichloride,
di(p-chlorophenyl)methylene(cyclopentadienyl)(dibenzofluorenyl)zirconium dichloride,
di(p-chlorophenyl)methylene(cyclopentadienyl)(1,1',3,6,8,8'-hexamethyl-2,7-dihydrodicyclopentafluorenyl)zirconium dichloride,
di(p-chlorophenyl)methylene(cyclopentadienyl)(1,3,3',6,6',8-hexamethyl-2,7-dihydrodicyclopentafluorenyl)zirconium dichloride,
di(p-chlorophenyl)methylene(cyclopentadienyl)(2,7-diphenyl-3,6-di-tert-butylfluorenyl)zirconium dichloride,
di(p-chlorophenyl)methylene(cyclopentadienyl)(2,7-dimethyl-3,6-di-tert-butylfluorenyl)zirconium dichloride,
di(p-chlorophenyl)methylene(cyclopentadienyl)(2,7-(trimethylphenyl)-3,6-di-tert-butylfluorenyl)zirconium dichloride,
di(p-chlorophenyl)methylene(cyclopentadienyl)(2,7-(dimethylphenyl)-3,6-di-tert-butylfluorenyl)zirconium dichloride,
di(p-chlorophenyl)methylene(cyclopentadienyl)(2,3,6,7-tetra-tert-butylfluorenyl)zirconium dichloride,
di(m-chlorophenyl)methylene(cyclopentadienyl)(2,7-di-tert-butylfluorenyl)zirconium dichloride,
di(m-chlorophenyl)methylene(cyclopentadienyl)(3,6-di-tert-butylfluorenyl)zirconium dichloride, di(m-chlorophenyl)methylene(cyclopentadienyl)(octamethyloctahydrodibenzofluorenyl)zirconium dichloride,
di(m-chlorophenyl)methylene(cyclopentadienyl)(octamethyltetrahydrodicyclopentafluorenyl)zirconium dichloride,
di(m-chlorophenyl)methylene(cyclopentadienyl)(dibenzofluorenyl)zirconium dichloride,
di(m-chlorophenyl)methylene(cyclopentadienyl)(1,1',3,6,8,8'-hexamethyl-2,7-dihydrodicyclopentafluorenyl)zirconium dichloride,
di(m-chlorophenyl)methylene(cyclopentadienyl)(1,3,3',6,6',8-hexamethyl-2,7-dihydrodicyclopentafluorenyl)zirconium dichloride,
di(m-chlorophenyl)methylene(cyclopentadienyl)(2,7-diphenyl-3,6-di-tert-butylfluorenyl)zirconium dichloride,
di(m-chlorophenyl)methylene(cyclopentadienyl)(2,7-dimethyl-3,6-di-tert-butylfluorenyl)zirconium dichloride,
di(m-chlorophenyl)methylene(cyclopentadienyl)(2,7-(trimethylphenyl)-3,6-di-tert-butylfluorenyl)zirconium dichloride,
di(m-chlorophenyl)methylene(cyclopentadienyl)(2,7-(dimethylphenyl)-3,6-di-tert-butylfluorenyl)zirconium dichloride,
di(m-chlorophenyl)methylene(cyclopentadienyl)(2,3,6,7-tetra-tert-butylfluorenyl)zirconium dichloride,
di(p-bromophenyl)methylene(cyclopentadienyl)(2,7-di-tert-butylfluorenyl)zirconium dichloride,
di(p-bromophenyl)methylene(cyclopentadienyl)(3,6-di-tert-butylfluorenyl)zirconium dichloride,
di(p-bromophenyl)methylene(cyclopentadienyl)(octamethyloctahydrodibenzofluorenyl)zirconium dichloride,
di(p-bromophenyl)methylene(cyclopentadienyl)(octamethyltetrahydrodicyclopentafluorenyl)zirconium dichloride,
di(p-bromophenyl)methylene(cyclopentadienyl)(dibenzofluorenyl)zirconium dichloride,
di(p-bromophenyl)methylene(cyclopentadienyl)(1,1',3,6,8,8'-hexamethyl-2,7-dihydrodicyclopentafluorenyl)zirconium dichloride,
di(p-bromophenyl)methylene(cyclopentadienyl)(1,3,3',6,6',8-hexamethyl-2,7-dihydrodicyclopentafluorenyl)zirconium dichloride,
di(p-bromophenyl)methylene(cyclopentadienyl)(2,7-diphenyl-3,6-di-tert-butylfluorenyl)zirconium dichloride,
di(p-bromophenyl)methylene(cyclopentadienyl)(2,7-dimethyl-3,6-di-tert-butylfluorenyl)zirconium dichloride,
di(p-bromophenyl)methylene(cyclopentadienyl)(2,7-(trimethylphenyl)-3,6-di-tert-butylfluorenyl)zirconium dichloride,
di(p-bromophenyl)methylene(cyclopentadienyl)(2,7-(dimethylphenyl)-3,6-di-tert-butylfluorenyl)zirconium dichloride,
di(p-bromophenyl)methylene(cyclopentadienyl)(2,3,6,7-tetra-tert-butylfluorenyl)zirconium dichloride,
di(m-trifluoromethyl-phenyl)methylene(cyclopentadienyl)(2,7-di-tert-butylfluorenyl)zirconium dichloride,
di(m-trifluoromethyl-phenyl)methylene(cyclopentadienyl)(3,6-di-tert-butylfluorenyl)zirconium dichloride,
di(m-trifluoromethyl-phenyl)methylene(cyclopentadienyl)(octamethyloctahydrodibenzofluorenyl)zirconium dichloride,
di(m-trifluoromethyl-phenyl)methylene(cyclopentadienyl)(octamethyltetrahydrodicyclopentafluorenyl)zirconium dichloride,
di(m-trifluoromethyl-phenyl)methylene(cyclopentadienyl)(dibenzofluorenyl)zirconium dichloride,
di(m-trifluoromethyl-phenyl)methylene(cyclopentadienyl)(1,1',3,6,8,8'-hexamethyl-2,7-dihydrodicyclopentafluorenyl)zirconium dichloride,
di(m-trifluoromethyl-phenyl)methylene(cyclopentadienyl)(1,3,3',6,6',8-hexamethyl-2,7-dihydrodicyclopentafluorenyl)zirconium dichloride,
di(m-trifluoromethyl-phenyl)methylene(cyclopentadienyl)(2,7-diphenyl-3,6-di-tert-butylfluorenyl)zirconium dichloride,
di(m-trifluoromethyl-phenyl)methylene(cyclopentadienyl)(2,7-dimethyl-3,6-di-tert-butylfluorenyl)zirconium dichloride,
di(m-trifluoromethyl-phenyl)methylene(cyclopentadienyl)(2,7-(trimethylphenyl)-3,6-di-tert-butylfluorenyl)zirconium dichloride,
di(m-trifluoromethyl-phenyl)methylene(cyclopentadienyl)(2,7-(dimethylphenyl)-3,6-di-tert-butylfluorenyl)zirconium dichloride,
di(m-trifluoromethyl-phenyl)methylene(cyclopentadienyl)(2,3,6,7-tetra-tert-butylfluorenyl)zirconium dichloride,
di(p-trifluoromethyl-phenyl)methylene(cyclopentadienyl)(2,7-di-tert-butylfluorenyl)zirconium dichloride,
di(p-trifluoromethyl-phenyl)methylene(cyclopentadienyl)(3,6-di-tert-butylfluorenyl)zirconium dichloride,
di(p-trifluoromethyl-phenyl)methylene(cyclopentadienyl)(octamethyloctahydrodibenzofluorenyl)zirconium dichloride,
di(p-trifluoromethyl-phenyl)methylene(cyclopentadienyl)(octamethyltetrahydrodicyclopentafluorenyl)zirconium dichloride,
di(p-trifluoromethyl-phenyl)methylene(cyclopentadienyl)(dibenzofluorenyl)zirconium dichloride,
di(p-trifluoromethyl-phenyl)methylene(cyclopentadienyl)(1,1',3,6,8,8'-hexamethyl-2,7-dihydrodicyclopentafluorenyl)zirconium dichloride,
di(p-trifluoromethyl-phenyl)methylene(cyclopentadienyl)(1,3,3',6,6',8-hexamethyl-2,7-dihydrodicyclopentafluorenyl)zirconium dichloride,
di(p-trifluoromethyl-phenyl)methylene(cyclopentadienyl)(2,7-diphenyl-3,6-di-tert-butylfluorenyl)zirconium dichloride,
di(p-trifluoromethyl-phenyl)methylene(cyclopentadienyl)(2,7-dimethyl-3,6-di-tert-butylfluorenyl)zirconium dichloride,
di(p-trifluoromethyl-phenyl)methylene(cyclopentadienyl)(2,7-(trimethylphenyl)-3,6-di-tert-butylfluorenyl)zirconium dichloride,
di(p-trifluoromethyl-phenyl)methylene(cyclopentadienyl)(2,7-(dimethylphenyl)-3,6-di-tert-butylfluorenyl)zirconium dichloride,
di(p-trifluoromethyl-phenyl)methylene(cyclopentadienyl)(2,3,6,7-tetra-tert-butylfluorenyl)zirconium dichloride,
di(p-tert-butyl-phenyl)methylene(cyclopentadienyl)(2,7-di-tert-butylfluorenyl)zirconium dichloride,
di(p-tert-butyl-phenyl)methylene(cyclopentadienyl)(3,6-di-tert-butylfluorenyl)zirconium dichloride,
di(p-tert-butyl-phenyl)methylene(cyclopentadienyl)(octamethyloctahydrodibenzofluorenyl)zirconium dichloride,
di(p-tert-butyl-phenyl)methylene(cyclopentadienyl)(octamethyltetrahydrodicyclopentafluorenyl)zirconium dichloride,
di(p-tert-butyl-phenyl)methylene(cyclopentadienyl)(dibenzofluorenyl)zirconium dichloride,
di(p-tert-butyl-phenyl)methylene(cyclopentadienyl)(1,1',3,6,8,8'-hexamethyl-2,7-dihydrodicyclopentafluorenyl)zirconium dichloride,
di(p-tert-butyl-phenyl)methylene(cyclopentadienyl)(1,3,3',6,6',8-hexamethyl-2,7-dihydrodicyclopentafluorenyl)zirconium dichloride, di(p-tert-butyl-phenyl)methylene(cyclopentadienyl)(2,7-diphenyl-3,6-di-tert-butylfluorenyl)zirconium dichloride,
di(p-tert-butyl-phenyl)methylene(cyclopentadienyl)(2,7-dimethyl-3,6-di-tert-butylfluorenyl)zirconium dichloride,
di(p-tert-butyl-phenyl)methylene(cyclopentadienyl)(2,7-(trimethylphenyl)-3,6-di-tert-butylfluorenyl)zirconium dichloride,
di(p-tert-butyl-phenyl)methylene(cyclopentadienyl)(2,7-(dimethylphenyl)-3,6-di-tert-butylfluorenyl)zirconium
di(p-tert-butyl-phenyl)methylene(cyclopentadienyl)(2,3,6,7-tetra-tert-butylfluorenyl)zirconium dichloride,
di(p-n-butyl-phenyl)methylene(cyclopentadienyl)(2,7-di-tert-butylfluorenyl)zirconium dichloride,
di(p-n-butyl-phenyl)methylene(cyclopentadienyl)(3,6-di-tert-butylfluorenyl)zirconium dichloride,
di(p-n-butyl-phenyl)methylene(cyclopentadienyl)(octamethyloctahydrodibenzofluorenyl)zirconium dichloride,
di(p-n-butyl-phenyl)methylene(cyclopentadienyl)(octamethyltetrahydrodicyclopentafluorenyl)zirconium dichloride,
di(p-n-butyl-phenyl)methylene(cyclopentadienyl)(dibenzofluorenyl)zirconium dichloride,
di(p-n-butyl-phenyl)methylene(cyclopentadienyl)(1,1',3,6,8,8'-hexamethyl-2,7-dihydrodicyclopentafluorenyl)zirconium dichloride,
di(p-n-butyl-phenyl)methylene(cyclopentadienyl)(1,3,3',6,6',8-hexamethyl-2,7-dihydrodicyclopentafluorenyl)zirconium dichloride,
di(p-n-butyl-phenyl)methylene(cyclopentadienyl)(2,7-diphenyl-3,6-di-tert-butylfluorenyl)zirconium dichloride,
di(p-n-butyl-phenyl)methylene(cyclopentadienyl)(2,7-dimethyl-3,6-di-tert-butylfluorenyl)zirconium dichloride,
di(p-n-butyl-phenyl)methylene(cyclopentadienyl)(2,7-(trimethylphenyl)-3,6-di-tert-butylfluorenyl)zirconium dichloride,
di(p-n-butyl-phenyl)methylene(cyclopentadienyl)(2,7-(dimethylphenyl)-3,6-di-tert-butylfluorenyl)zirconium dichloride,
di(p-n-butyl-phenyl)methylene(cyclopentadienyl)(2,3,6,7-tetra-tert-butylfluorenyl)zirconium dichloride,
di(p-biphenyl)methylene(cyclopentadienyl)(2,7-di-tert-butylfluorenyl)zirconium dichloride,
di(p-biphenyl)methylene(cyclopentadienyl)(3,6-di-tert-butylfluorenyl)zirconium dichloride,
di(p-biphenyl)methylene(cyclopentadienyl)(octamethyloctahydrodibenzofluorenyl)zirconium dichloride,
di(p-biphenyl)methylene(cyclopentadienyl)(octamethyltetrahydrodicyclopentafluorenyl)zirconium dichloride,
di(p-biphenyl)methylene(cyclopentadienyl)(dibenzofluorenyl)zirconium dichloride,
di(p-biphenyl)methylene(cyclopentadienyl)(1,1',3,6,8,8'-hexamethyl-2,7-dihydrodicyclopentafluorenyl)zirconium dichloride,
di(p-biphenyl)methylene(cyclopentadienyl)(1,3,3',6,6',8-hexamethyl-2,7-dihydrodicyclopentafluorenyl)zirconium dichloride,
di(p-biphenyl)methylene(cyclopentadienyl)(2,7-diphenyl-3,6-di-tert-butylfluorenyl)zirconium dichloride,
di(p-biphenyl)methylene(cyclopentadienyl)(2,7-dimethyl-3,6-di-tert-butylfluorenyl)zirconium dichloride,
di(p-biphenyl)methylene(cyclopentadienyl)(2,7-(trimethylphenyl)-3,6-di-tert-butylfluorenyl)zirconium dichloride,
di(p-biphenyl)methylene(cyclopentadienyl)(2,7-(dimethylphenyl)-3,6-di-tert-butylfluorenyl)zirconium dichloride,
di(p-biphenyl)methylene(cyclopentadienyl)(2,3,6,7-tetra-tert-butylfluorenyl)zirconium dichloride,
di(1-naphthyl)methylene(cyclopentadienyl)(2,7-di-tert-butylfluorenyl)zirconium dichloride,
di(1-naphthyl)methylene(cyclopentadienyl)(3,6-di-tert-butylfluorenyl)zirconium dichloride,
di(1-naphthyl)methylene(cyclopentadienyl)(octamethyloctahydrodibenzofluorenyl)zirconium dichloride,
di(1-naphthyl)methylene(cyclopentadienyl)(octamethyltetrahydrodicyclopentafluorenyl)zirconium dichloride,
di(1-naphthyl)methylene(cyclopentadienyl)(dibenzofluorenyl)zirconium dichloride,
di(1-naphthyl)methylene(cyclopentadienyl)(1,1',3,6,8,8'-hexamethyl-2,7-dihydrodicyclopentafluorenyl)zirconium dichloride,
di(1-naphthyl)methylene(cyclopentadienyl)(1,3,3',6,6',8-hexamethyl-2,7-dihydrodicyclopentafluorenyl)zirconium dichloride,
di(1-naphthyl)methylene(cyclopentadienyl)(2,7-diphenyl-3,6-di-tert-butylfluorenyl)zirconium dichloride,
di(1-naphthyl)methylene(cyclopentadienyl)(2,7-dimethyl-3,6-di-tert-butylfluorenyl)zirconium dichloride,
di(1-naphthyl)methylene(cyclopentadienyl)(2,7-(trimethylphenyl)-3,6-di-tert-butylfluorenyl)zirconium dichloride,
di(1-naphthyl)methylene(cyclopentadienyl)(2,7-(dimethylphenyl)-3,6-di-tert-butylfluorenyl)zirconium dichloride,
di(1-naphthyl)methylene(cyclopentadienyl)(2,3,6,7-tetra-tert-butylfluorenyl)zirconium dichloride,
di(2-naphthyl)methylene(cyclopentadienyl)(2,7-di-tert-butylfluorenyl)zirconium dichloride,
di(2-naphthyl)methylene(cyclopentadienyl)(3,6-di-tert-butylfluorenyl)zirconium dichloride,
di(2-naphthyl)methylene(cyclopentadienyl)(octamethyloctahydrodibenzofluorenyl)zirconium dichloride,
di(2-naphthyl)methylene(cyclopentadienyl)(octamethyltetrahydrodicyclopentafluorenyl)zirconium dichloride,
di(2-naphthyl)methylene(cyclopentadienyl)(dibenzofluorenyl)zirconium dichloride,
di(2-naphthyl)methylene(cyclopentadienyl)(1,1',3,6,8,8'-hexamethyl-2,7-dihydrodicyclopentafluorenyl)zirconium dichloride,
di(2-naphthyl)methylene(cyclopentadienyl)(1,3,3',6,6',8-hexamethyl-2,7-dihydrodicyclopentafluorenyl)zirconium dichloride,
di(2-naphthyl)methylene(cyclopentadienyl)(2,7-diphenyl-3,6-di-tert-butylfluorenyl)zirconium dichloride,
di(2-naphthyl)methylene(cyclopentadienyl)(2,7-dimethyl-3,6-di-tert-butylfluorenyl)zirconium dichloride,
di(2-naphthyl)methylene(cyclopentadienyl)(2,7-(trimethylphenyl)-3,6-di-tert-butylfluorenyl)zirconium dichloride,
di(2-naphthyl)methylene(cyclopentadienyl)(2,7-(dimethylphenyl)-3,6-di-tert-butylfluorenyl)zirconium dichloride,
di(2-naphthyl)methylene(cyclopentadienyl)(2,3,6,7-tetra-tert-butylfluorenyl)zirconium dichloride,
di(m-tolyl)methylene(cyclopentadienyl)(2,7-di-tert-butylfluorenyl)zirconium dichloride,
di(m-tolyl)methylene(cyclopentadienyl)(2,7-dimethylfluorenyl)zirconium dichloride,
di(m-tolyl)methylene(cyclopentadienyl)(3,6-di-tert-butylfluorenyl)zirconium dichloride,
di(p-isopropylphenyl)methylene(cyclopentadienyl)(octamethyloctahydrodibenzofluorenyl)zirconium dichloride,
di(p-isopropylphenyl)methylene(cyclopentadienyl)(octamethyloctahydrodibenzofluorenyl)zirconium dichloride,
di(p-isopropylphenyl)methylene(cyclopentadienyl)(2,7-di-tert-butylfluorenyl)zirconium dichloride,
di(p-isopropylphenyl)methylene(cyclopentadienyl)(3,6-di-tert-butylfluorenyl)zirconium dichloride, diphenylsilylene(cyclopentadienyl)(2,7-di-tert-butylfluorenyl)zirconium dichloride,
diphenylsilylene(cyclopentadienyl)(3,6-di-tert-butylfluorenyl)zirconium dichloride,
diphenylsilylene(cyclopentadienyl)(octamethyloctahydrodibenzofluorenyl)zirconium dichloride,
diphenylsilylene(cyclopentadienyl)(octamethyltetrahydrodicyclopentafluorenyl)zirconium dichloride,
diphenylsilylene(cyclopentadienyl)(dibenzofluorenyl)zirconium dichloride,
diphenylsilylene(cyclopentadienyl)(1,1',3,6,8,8'-hexamethyl-2,7-dihydrodicyclopentafluorenyl)zirconium dichloride,
diphenylsilylene(cyclopentadienyl)(1,3,3',6,6',8-hexamethyl-2,7-dihydrodicyclopentafluorenyl)zirconium dichloride,
diphenylsilylene(cyclopentadienyl)(2,7-diphenyl-3,6-di-tert-butylfluorenyl)zirconium dichloride,
diphenylsilylene(cyclopentadienyl)(2,7-dimethyl-3,6-di-tert-butylfluorenyl)zirconium dichloride,
diphenylsilylene(cyclopentadienyl)(2,7-(trimethylphenyl)-3,6-di-tert-butylfluorenyl)zirconium dichloride,
diphenylsilylene(cyclopentadienyl)(2,7-(dimethylphenyl)-3,6-di-tert-butylfluorenyl)zirconium dichloride, and
diphenylsilylene(cyclopentadienyl)(2,3,6,7-tetra-tert-butylfluorenyl)zirconium dichloride.

As the crosslinked metallocene compounds [A3], there can be also mentioned compounds wherein "zirconium" in the above compounds given as examples is replaced with "hafnium" or "titanium", compounds wherein "dichloride" in the above compounds is replaced with "difluoride", "dibromide", "diiodide", "dimethyl", "methylethyl" or the like, and compounds wherein "cyclopentadienyl" in the above compounds is replaced with "3-tert-butyl-5-methyl-cyclopentadienyl", "3,5-dimethyl-cyclopentadienyl", "3-tert-butyl-cyclopentadienyl", "3-methyl-cyclopentadienyl" or the like.

The above metallocene compounds [A] can be produced by publicly known processes, and the production process is not specifically restricted. Examples of the publicly known processes include processes described in WO 01/27124 and WO 04/029062 filed by the present applicant.

<Compound (B) which Reacts with Metallocene Compound (A) to Form Ion Pair>

In the present invention, the compound (B) which reacts with the metallocene compound (A) to form an ion pair is a compound represented by the general formula [B1].

[Chem. 14]

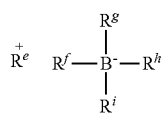

[B1]

In the formula [B1], $R^{e+}$ is carbenium cation, and $R^f$ to $R^i$ are each independently a hydrocarbon group of 1 to 20 carbon atoms or a halogenated hydrocarbon group of 1 to 20 carbon atoms. In the present invention, the carbenium cation represented by $R^{e+}$ is specifically tricoordinate carbocation having a structure represented by $R_3C^+$. Here, three R may be the same as or different from one another and can have various substituents. In general, straight-chain or branched aliphatic hydrocarbon groups of 1 to 30 carbon atoms, preferably 1 to 20 carbon atoms, more preferably 1 to 10 carbon atoms; alicyclic hydrocarbon groups of 3 to 30 carbon atoms, preferably 3 to 20 carbon atoms, more preferably 3 to 10 carbon atoms; and aromatic hydrocarbon groups of 6 to 30 carbon atoms, preferably 6 to 20 carbon atoms, more preferably 6 to 10 carbon atoms, can be mentioned. In these various hydrocarbon groups, at least one hydrogen atom may be replaced with another hydrocarbon group.

Examples of the carbenium cations include tri-substituted carbenium cations, such as triphenylcarbenium cation, tris(methylphenyl)carbenium cation and tris(dimethylphenyl)carbenium cation. Preferable is triphenylcarbenium cation from the viewpoint that high polymerization activity is exhibited even at a wide range of temperatures and it is industrially easily available.

As the ionizing ionic compound that can be generally used as a component of an olefin polymerization catalyst, a compound having anilinium cation can be also mentioned in addition to the aforesaid compound having carbenium cation. However, it has been found that when the olefin polymerization catalyst for use in the present invention is constituted of a metallocene compound, an ionizing ionic compound and an aluminum compound, it is difficult to completely dissolve the ionizing ionic compound having anilinium cation in a saturated hydrocarbon solvent.

On the other hand, the ionizing ionic compound having carbenium cation is relatively rich in reactivity with the following compound (C) as described later, and therefore, it has become feasible to dissolve the ionizing ionic compound even in a saturated hydrocarbon solvent as long as the concentration is in a specific range.

Of the substituents represented by $R^f$ to $R^i$, the hydrocarbon groups of 1 to 20 carbon atoms are, for example, aromatic hydrocarbon groups of 6 to 20 carbon atoms, and preferable are unsubstituted aryl groups and substituted aryl groups. The substituents in the aryl groups are, for example, hydrocarbon groups.

The halogenated hydrocarbon groups of 1 to 20 carbon atoms are, for example, halogenated aromatic hydrocarbon groups of 6 to 20 carbon atoms, and preferable are halogenated aryl groups. The substituents in the aryl groups are, for example, halogenated hydrocarbon groups and halogen atoms.

Specific examples of the hydrocarbon groups and the halogenated hydrocarbon groups include phenyl group, tolyl group, dimethylphenyl group, trifluoromethylphenyl group, ditrifluoromethylphenyl group and pentafluorophenyl group.

Specific examples of the compounds represented by the general formula [B1] include triphenylcarbenium tetraphenylborate, triphenylcarbenium tetrakis(pentafluorophenyl)borate, triphenylcarbenium tetrakis(3,5-ditrifluoromethylphenyl)borate, tris(4-methylphenyl)carbenium tetrakis(pentafluorophenyl)borate and tris(3,5-dimethylphenyl)carbenium tetrakis(pentafluorophenyl)borate.

The component (B) may be used singly, or may be used in combination of two or more kinds.

As the component (B), triphenylcarbenium tetrakis(pentafluorophenyl)borate is particularly preferable from the viewpoints of reactivity with the following compound (C) and solubility in a saturated hydrocarbon solvent and from the viewpoint of industrially easy availability.

<Compound (C)>

In the present invention, the compound (C) is at least one compound selected from an organoaluminum compound (C-1) and an organoaluminum oxy compound (C-2), and it is preferable to use at least one organoaluminum compound (C-1). In the present invention, the organoaluminum oxy compound (C-2) is a compound having Al—C bond and having plural independent Al—O bonds, and the organoaluminum compound (C-1) is a compound having Al—C bond but not having plural independent Al—O bonds (having no independent Al—O bond or having one independent Al—O bond). However, the term "independent Al—O bond" means that Al atom and O atom are not counted repeatedly as in such cases that the number of Al—O bonds in —Al(R)—O—Al(R)—O—Al— is 2 and the number of Al—O bonds in RAl(OR)$_2$ is 1 (R is, for example, hydrocarbon group). In the present invention, therefore, the organoaluminum oxy compounds (C-2) are not included in the organoaluminum compounds (C-1).

In the selection of the organoaluminum compound (C-1), one kind thereof may be selected, or two or more kinds thereof may be selected in combination. When the organoaluminum oxy compound (C-2) is selected, one kind thereof may be selected, or two or more kinds thereof may be selected in combination.

<<Organoaluminum Compound (C-1)>>

The organoaluminum compound (C-1) is, for example, an organoaluminum compound represented by the general formula [C2] or [C3] or a complex alkylated compound of a periodic table Group 1 metal and aluminum, which is represented by the general formula [C4].

$$R^a{}_m Al(OR^b)_n X_p \quad [C2]$$

In the formula [C2], $R^a$ and $R^b$ are each independently a hydrocarbon group of 1 to 15 carbon atoms, preferably 1 to 4 carbon atoms, X is a halogen atom, m is a number of 0<m≤3, n is a number of 0≤n<3, p is a number of 0≤p<3, and m+n+p=3.

Examples of the organoaluminum compounds represented by the general formula [C2] include:

tri-n-alkylaluminums, such as trimethylaluminum, triethylaluminum, tri-n-butylaluminum, trihexylaluminum and tri-octylaluminum;

branched-chain trialkylaluminums, such as triisopropylaluminum, triisobutylaluminum, tri-sec-butylaluminum, tri-tert-butylaluminum, tri-2-methylbutylaluminum, tri-3-methylhexylaluminum and tri-2-ethylhexylaluminum;

tricycloalkylaluminums, such as tricyclohexylaluminum and tricyclooctylaluminum; triarylaluminums, such as triphenylaluminum and tritolylaluminum;

alkenylaluminums represented by the general formula (i-C$_4$H$_9$)$_x$Al$_y$(C$_5$H$_{10}$)$_z$ (wherein x, y and z are positive integers, and z≤2<x), such as isoprenylaluminum;

alkylaluminum dialkoxides, such as isobutylaluminum dimethoxide and isobutylaluminum diethoxide; dialkylaluminum alkoxides, such as dimethylaluminum methoxide, diethylaluminum ethoxide and dibutylaluminum butoxide; alkylaluminum sesquialkoxides, such as ethylaluminum sesquiethoxide and butylaluminum sesquibutoxide;

partially alkoxylated alkylaluminums having average composition represented by the general formula $R^a{}_{2.5}Al(OR^b)_{0.5}$ (wherein $R^a$ and $R^b$ have the same meanings as those of $R^a$ and $R^b$ in the formula [C2]); alkylaluminum aryloxides, such as diethylaluminum phenoxide and diethylaluminum(2,6-di-t-butyl-4-methylphenoxide); dialkylaluminum halides, such as dimethylaluminum chloride, diethylaluminum chloride, dibutylaluminum chloride, diethylaluminum bromide and diisobutylaluminum chloride; alkylaluminum sesquihalides, such as ethylaluminum sesquichloride, butylaluminum sesquichloride and ethylaluminum sesquibromide;

partially halogenated alkylaluminums, e.g., alkylaluminum dihalides, such as ethylaluminum dichloride; and partially alkoxylated and halogenated alkylaluminums, such as ethylaluminum ethoxychloride, butylaluminum butoxychloride and ethylaluminum ethoxybromide.

$$R_q AlH_r \quad [C3]$$

In the formula [C3], R is a hydrocarbon group of 1 to 15 carbon atoms, preferably 1 to 4 carbon atoms, and when plural R are present, they may be the same as or different from each other. Examples of the hydrocarbon groups include alkyl groups of 1 to 15 carbon atoms, cycloalkyl groups of 3 to 15 carbon atoms, and aryl groups of 6 to 15 carbon atoms. q is a number of r is a number of 1≤r≤3, and q+r=3.

Examples of the aluminum compounds having Al—H bond, which are represented by the general formula [C3], include dimethylaluminum hydride, diethylaluminum hydride, diisopropylaluminum hydride, dibutylaluminum hydride, diisobutylaluminum hydride, diisohexylaluminum hydride, diphenylaluminum hydride, dicyclohexylaluminum hydride, phenylaluminum dihydride and alane.

$$M^2 AlR^a{}_4 \quad [C4]$$

In the formula [C4], $M^2$ is Li, Na or K, and plural $R^a$ are each independently a hydrocarbon group of 1 to 15 carbon atoms, preferably 1 to 4 carbon atoms.

Examples of the compounds represented by the general formula [C4] include LiAl(C$_2$H$_5$)$_4$ and LiAl(C$_7$H$_{15}$)$_4$.

Further, compounds analogous to the compounds represented by the general formula [C4] can be also used, and for example, organoaluminum compounds wherein two or more aluminum compounds are bonded through a nitrogen atom can be mentioned. Such a compound is, for example, (C$_2$H$_5$)$_2$AlN(C$_2$H$_5$)Al(C$_2$H$_5$)$_2$.

As the organoaluminum compounds (C-1), compounds represented by the general formula [C2] are preferable, and of these, compounds of the general formula [C2] wherein m is 3 are preferable from the viewpoint of industrially easy availability. Of these, compounds represented by the general formula [C1] are particularly preferable from the viewpoints of reactivity with the component (B), stability of the catalyst solution and solubility.

[Chem. 15]

$$AlR_3 \quad [C1]$$

In the formula [C1], R is a straight-chain or branched alkyl group of 3 to 10 carbon atoms.

Specifically, triisopropylaluminum, trinormalpropylaluminum, triisobutylaluminum, trinormalbutylaluminum, trinormalhexylaluminum and trinormaloctylaluminum are preferable, and of these, triisobutylaluminum, trinormalhexylaluminum and trinormaloctylaluminum are particularly preferable from the viewpoints of solubility in saturated hydrocarbon solvents and industrially easy availability.

<<Organoaluminum Oxy Compound (C-2)>>

Examples of the organoaluminum oxy compounds (C-2) include hitherto publicly known aluminoxanes, such as a compound represented by the general formula (C5) and a compound represented by the general formula (C6), methylaluminoxane analogs, such as modified methylaluminoxane represented by the general formula [C7], and a boron-containing organoaluminum oxy compound represented by the general formula [C8].

[Chem. 16]

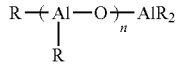

[C5]

[Chem. 17]

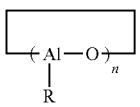

[C6]

In the formulas [C5] and [C6], R is a hydrocarbon group of 1 to 10 carbon atoms, preferably a methyl group, n is an integer of 2 or greater, preferably 3 or greater, more preferably 10 or greater, and the upper limit of n is usually 30 though it is not specifically restricted. Plural R may be the same as or different from each other. The organoaluminum oxy compound having a methyl group as R is also referred to as "methylaluminoxane" hereinafter.

[Chem. 18]

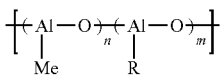

[C7]

In the formula [C7], R is a hydrocarbon group of 2 to 20 carbon atoms, m and n are each independently an integer of 2 or greater, and the upper limit of m+n is usually 40 though it is not specifically restricted. Plural R may be the same as or different from each other.

The methylaluminoxane is an organoaluminum oxy compound that has been frequently used in the polyolefin industry because of ease of obtaining and height of polymerization activity. Further, methylaluminoxane analogs having excellent solubility in saturated hydrocarbon solvents (e.g., modified methylaluminoxane represented by the formula [C7]) have been also developed.

The modified methylaluminoxane represented by the formula [C7] is prepared by using, for example, trimethylaluminum and alkylaluminum other than trimethylaluminum (preparation process is disclosed in, for example, U.S. Pat. No. 4,960,878 and U.S. Pat. No. 5,041,584). Modified methylaluminoxane (that is, having isobutyl group as R) prepared using trimethylaluminum and triisobutylaluminum has been commercially produced under the name of MMAO or TMAO by makers such as Tosoh Finechem Corporation (see, for example, "Tosoh research & technology review" Vol. 47, 55 (2003)).

In the solution polymerization in the process for producing an olefin polymer of the present invention, a benzene-insoluble organoaluminum oxy compound given as an example in Japanese Patent Laid-Open Publication No. 2-78687 can be also used.

[Chem. 19]

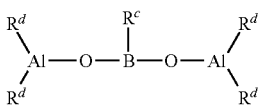

[C8]

In the formula [C8], $R^c$ is a hydrocarbon group of 1 to 10 carbon atoms. Plural $R^d$ are each independently a halogen atom or a hydrocarbon group of 1 to 10 carbon atoms.

<Saturated Hydrocarbon Solvent (D)>

The saturated hydrocarbon solvent (D) used for dissolving each component of the components (A) to (C) is an inert hydrocarbon solvent and is more preferably a saturated hydrocarbon solvent having a boiling point of 20 to 200° C. at ordinary pressure.

As the saturated hydrocarbon solvent (D), at least one hydrocarbon solvent selected from aliphatic hydrocarbon solvents and alicyclic hydrocarbon solvents is preferably used. Examples of the aliphatic hydrocarbon solvents include pentane, hexane, heptane, octane, decane, dodecane and kerosene, and examples of the alicyclic hydrocarbon solvents include cyclopentane, cyclohexane and methylcyclopentane. Of these, aliphatic hydrocarbons, such as pentane, hexane, heptane, octane and decane, are more preferable.

In the present invention, it is preferable to use the aforesaid saturated hydrocarbon solvent (D) singly, as the solvent used for dissolving each component of the components (A) to (C). However, in addition to the saturated hydrocarbon solvent (D), aromatic hydrocarbon, such as benzene, toluene or xylene, or halogenated hydrocarbon, such as ethylene chloride, chlorobenzene or dichloromethane, can be contained in such an amount that the solvent residue in the resulting polymer is permissible and that the burden of the solvent removal step in the olefin polymer production process is permissible. In the preparation of the olefin polymerization catalyst solution, the amount of each of the aromatic hydrocarbon solvent and the halogenated hydrocarbon solvent is preferably not more than 10% by mass, more preferably not more than 5% by mass, based on the total amount of the solvents, but it is particularly preferable to use none of the aromatic hydrocarbon solvent and the halogenated hydrocarbon solvent, as previously described.

The saturated hydrocarbon solvents (D) may be used singly, or may be used in combination of two or more kinds.

<Preparation of Olefin Polymerization Catalyst Solution>

In the process for producing an olefin polymer of the present invention, the olefin polymerization catalyst solution is obtained by dissolving each component of the components (A) to (C) in the saturated hydrocarbon solvent (D).

With regard to solubility of each component of the components (A) to (C) in the saturated hydrocarbon solvent (D), many of the components (A) and (C) are soluble, and many of the components (B) are insoluble.

In general, it is thought that when the components (A) to (C) are each independently dissolved (suspended) in the saturated hydrocarbon solvent (D) and fed to the polymerization reactor, the reaction between the components (A) to (C) in the reactor is extremely slow because the component (B) is insoluble in the saturated hydrocarbon solvent (D), so that an active species is rarely formed.

On the other hand, in the present invention, a preparation process for an olefin polymerization catalyst solution, in which prior to feeding of the components (A) to (C) to the polymerization reactor, the components (A) to (C) are mixed with the saturated hydrocarbon solvent (D) so that the concentration of each component might be in a specific range, is adopted. As a result, dissolution of the component (B) in the saturated hydrocarbon solvent, which was difficult by the conventional technology, has become possible, and with this, formation of an active species of the olefin polymer has favorably proceeded. In addition, it has become possible to homogeneously dissolve the active species in the saturated hydrocarbon solvent.

Although the reason is not clear, it is presumed as follows.

It is thought that when biscyclopentadienylzirconium dichloride ($Cp_2ZrCl_2$), triphenylcarbenium tetrakis(pentafluorophenyl)borate ($[Ph_3C]^+[B(C_6F_5)_4]^-$) and triisobutylaluminum ($AliBu_3$) are used as the component (A), the component (B) and the component (C), respectively, the reaction to form an olefin polymerization catalyst (active species) from the component (A), the component (B) and the component (C) proceeds through the pathways shown by the following (a) to (c).

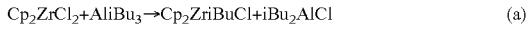  (a)

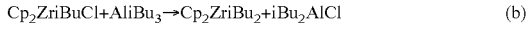  (b)

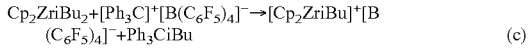  (c)

Even in the case where an aromatic hydrocarbon solvent is used as the solvent for the solution polymerization and the components (A) to (C) are separately fed to the polymerization reactor, the reactions (a) to (c) usually proceed without any problem.

However, it is thought that when the solvent for the solution polymerization is changed to a saturated hydrocarbon solvent and the same operation is carried out, triphenylcarbenium tetrakis(pentafluorophenyl)borate is hardly dissolved in the saturated hydrocarbon solvent, so that the reaction (c) rarely proceeds in the solvent, and an active species is hardly formed.

Here, it is thought that in the present invention, the components (A) to (C) are mixed in advance with the saturated hydrocarbon solvent in higher concentration as compared with the concentration in the environment of the polymerization reactor, whereby the components (B) and (C), which hardly react with each other in circumstances where the concentration is low, undergo reaction through the pathway shown by the following (d), and the component (B) becomes soluble in the saturated hydrocarbon solvent.

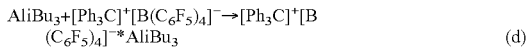  (d)

It is thought that the component (B) ($[Ph_3C]^+[B(C_6F_5)_4]^-*AliBu_3$) thus dissolved further reacts with a reaction product produced in the above (b), whereby an active species can be formed.

In the preparation of the olefin polymerization catalyst solution, the component (A) is usually used in an amount of $10^{-7}$ to $10^{-2}$ mol, preferably $10^{-6}$ to $10^{-3}$ mol, based on 1 liter of the saturated hydrocarbon solvent (D).

The component (B) is usually used in an amount of $10^{-7}$ to $10^{-2}$ mol, preferably $10^{-6}$ to $15\times10^{-3}$ mol, based on 1 liter of the saturated hydrocarbon solvent (D).

The component (C) is used in such an amount that the amount of an aluminum atom in the component (C) usually becomes $10^{-5}$ to 5 mol, preferably $10^{-4}$ to 2 mol, based on 1 liter of the saturated hydrocarbon solvent (D).

In the present invention, in order to completely dissolve the components (A) to (C) in the saturated hydrocarbon solvent, and besides, in order to carry out polymerization of an olefin with high activity, the components (A) to (C) that are mixed in advance with the saturated hydrocarbon solvent need to satisfy the following requirements (i) to (iv).

(i) The amount of the metallocene compound (A) added to 1 liter of the saturated hydrocarbon solvent (D) is 0.02 to 0.6 mmol.

(ii) The molar ratio ((C)/(A)) of an aluminum atom in the compound (C) added to the saturated hydrocarbon solvent (D) to the metallocene compound (A) is 33 to 5000.

(iii) The amount of an aluminum atom in the compound (C) added to 1 liter of the saturated hydrocarbon solvent (D) is 3 to 1000 mmol.

(iv) The molar ratio ((B)/(A)) of the compound (B) added to the saturated hydrocarbon solvent (D) to the metallocene compound (A) is 1 to 15.

The conditions (i) to (iv) are described below.

<Condition (i)>

The amount of the metallocene compound (A) added is 0.02 to 0.6 mmol based on 1 liter of the saturated hydrocarbon solvent (D). When the amount added is within this range, the metallocene compound (A) is completely dissolved in the saturated hydrocarbon solvent (D), and it becomes possible to carry out olefin polymerization with high activity, so that such an amount is preferable. On the other hand, if the amount of the metallocene compound added is less than 0.02 mmol, olefin polymerization activity is lowered, so that such an amount is undesirable. If the amount added exceeds 0.6 mmol, the metallocene compound (A) remains undissolved, or the active species formed by the reaction between the components (A), (B) and (C) is precipitated, so that such an amount is undesirable. Even in this case, however, by using a portion (supernatant portion) in which the metallocene compound (A) is dissolved is used as the olefin polymerization catalyst solution, the effect of the present invention can be exerted.

The amount of the metallocene compound (A) added is preferably 0.03 to 0.6 mmol, more preferably 0.05 to 0.5 mmol, still more preferably 0.075 to 0.4 mmol.

<Condition (ii)>

The molar ratio ((C)/(A)) of an aluminum atom in the compound (C) added to the saturated hydrocarbon solvent (D) to the metallocene compound (A) is 33 to 5000. The molar ratio ((C)/(A)) in this range is preferable from the viewpoint that the active species is rarely deactivated.

The molar ratio ((C)/(A)) is preferably 50 to 2500, more preferably 100 to 2000, still more preferably 150 to 1000.

<Condition (iii)>

The amount of the compound (C) added is such an amount that the amount of an aluminum atom in the compound (C) becomes 3 to 1000 mmol based on 1 liter of the saturated hydrocarbon solvent (D). When the amount added is within this range, the compound (C) in an amount of such extent as capable of being used for activation reaction of the metallocene compound (A) is secured, and the compound (C) captures impurities (such as $H_2O$) that are present in a slight amount in the saturated hydrocarbon solvent (D) and become catalyst poison, whereby it becomes possible to stably maintain the catalytically active species formed.

The amount of the compound (C) added is preferably 5 to 500 mmol, more preferably 10 to 300 mmol, still more preferably 50 to 250 mmol.

When the organoaluminum compound (C-1) and the organoaluminum oxy compound (C-2) are both used as the compound (C), the amount of the compound (C) added is the total amount of the compounds (C-1) and (C-2).

<Condition (iv)>

The molar ratio ((B)/(A)) of the compound (B) added to the saturated hydrocarbon solvent (D) to the metallocene compound (A) is 1 to 15. As is clear from the aforesaid reaction mechanism, the reaction between the component (A) and the component (B) is a reaction of 1:1 in terms of the number of moles, and therefore, if the molar ratio is not less than 1, they can be used without any problem particularly from the viewpoint of olefin polymerization activity. On the other hand, the upper limit of the molar ratio is not specifically restricted, but raising of the ratio too high leads to increase in cost, and there is a possibility of remaining of the compound (B) undissolved, so that the upper limit is determined for convenience.

The molar ratio ((B)/(A)) is preferably 1 to 10, more preferably 1 to 7, still more preferably 1.5 to 5.

The amounts of the components (A) and (C) added to the saturated hydrocarbon solvent in the conditions (i) and (iii) have only to satisfy those conditions in the preparation of the olefin polymerization catalyst solution. Therefore, even if the solution is subjected to dilution or the like after preparation and then fed to the polymerization reactor, there is no difference in the effect.

There is no specific limitation on the order of addition of the components (A) to (C) to the saturated hydrocarbon solvent (D). Specifically, a method of adding the components (A) to (C) to the saturated hydrocarbon solvent (D) at the same time and a method of adding the components (A) to (C) to the saturated hydrocarbon solvent (D) in an arbitrary order can be mentioned. In these addition methods, any of an embodiment wherein the components (A) to (C) are added to the saturated hydrocarbon solvent (D) all together and an embodiment wherein they are added by dividing them into portions can be adopted.

With regard to preferred order of successive addition of the components (A), (B) and (C) to prepare the catalyst solution, there can be mentioned a method wherein the components (A) and (C) are added to the saturated hydrocarbon solvent (D) and then the component (B) is added or a method wherein the components (B) and (C) are added to the saturated hydrocarbon solvent (D) and then the component (A) is added.

When the component (A) is added after the components (B) and (C) are added to the saturated hydrocarbon solvent (D), it is desirable to add the component (A) in 0 to 60 minutes, preferably 0 to 30 minutes, more preferably 0 to 15 minutes, after the beginning of mixing of the previously added two components with the saturated hydrocarbon solvent (D), from the viewpoints of ease of dissolution of each component in the saturated hydrocarbon solvent (D), life of the resulting catalytic active species or the component (B), etc., though it depends upon the degree of progress of dissolution of the previously added two components in the saturated hydrocarbon solvent (D).

When the component (B) is added after the components (A) and (C) are added to the saturated hydrocarbon solvent (D), the component (B) is added in 0 to 600 minutes, preferably 0 to 300 minutes, more preferably 0 to 120 minutes, after the beginning of mixing of the previously added two components with the saturated hydrocarbon solvent (D), though there is no specific limitation.

[Process for Producing Olefin Polymer]

The process for producing an olefin polymer of the present invention has a step comprising feeding the above-mentioned olefin polymerization catalyst solution to a polymerization reactor and carrying out solution polymerization of an olefin in the polymerization reactor. The term "solution polymerization" is the general term for methods to carry out polymerization in such a state that the polymer has been dissolved in a reaction solvent.

When the aforesaid components (A) to (C) are each used, there can be mentioned, as methods to generally feed olefin polymerization catalyst components to the polymerization reactor in the solution polymerization, [m1] a method of feeding a mixed liquid as it is to the polymerization reactor, said mixed liquid being obtained by mixing the components (A) to (C) and the hydrocarbon solvent all together, and [m2] a method comprising preparing hydrocarbon solvent solutions (or suspensions) of the components (A) to (C), respectively, and feeding them independently to the polymerization reactor.

When the hydrocarbon solvent is an aromatic hydrocarbon solvent, each component of the components (A) to (C) is easily dissolved in the solvent, and therefore, a problem rarely occurs in the olefin polymerization reaction.

However, when the hydrocarbon solvent is the saturated hydrocarbon solvent (D), the catalyst does not become a completely homogeneous solution in the methods [m1] and [m2] in many cases. If insolubles are fed to the polymerization reactor together with the solution, (a) the insolubles sometimes settle out in a catalyst feed line to bring about choking of the line, (b) the feed rate does not become constant, and the polymerization activity is not stabilized occasionally, and (c) the insolubles remain in the product polymer to cause poor transparency (fish eye). Moreover, the active sites in the reaction field are heterogeneous similarly to the case where the ionizing ionic compound is not dissolved and is used in a suspended state in a solvent, and therefore, a polymer other than the desired polymer is produced during the polymerization to thereby markedly deteriorate the productivity. For example, in the continuous production of an ethylene/butene copolymer using ethylene and butene, if the polymerization is carried out with continuously feeding a catalyst, ethylene and butene to the polymerization container, there occurs a phenomenon that as the operation time is increased, a polymer having a higher ethylene content than the product is precipitated in the polymerization vessel, and the precipitated polymer adheres to the polymerization vessel wall or the stirring blade to make long-term continuous operation impossible.

Also from this, the components (A) to (C) are desired to become a homogeneous solution when the method [m1] or the method [m2] is adopted, and on this account, it is particularly preferable to adopt the conditions defined in the preparation process for the olefin polymerization catalyst solution in the present invention.

If insolubles of the components (A) to (C) are present, [m3] a method of feeding a supernatant liquid, which is obtained by removing insolubles from a mixed liquid obtained by mixing the components (A) to (C) and the saturated hydrocarbon solvent (D) all together, to the polymerization reactor and [m4] a method of feeding a supernatant liquid, which is obtained by removing insolubles from a mixed liquid obtained by mixing saturated hydrocarbon solvent (D) solutions (or suspensions) of the components (A) to (C), to the polymerization reactor are also available.

When the olefin polymerization catalyst solution is fed to the polymerization reactor, it is also possible to feed the olefin polymerization catalyst solution prepared by the aforesaid method, as it is, to the polymerization reactor, but the olefin polymerization catalyst solution may be appropriately diluted before use according to the properties of the desired olefin polymer.

In the solution polymerization, the polymerization temperature is usually 20 to 300° C., preferably 30 to 250° C., more preferably 50 to 200° C. The polymerization pressure is usually ordinary pressure to 10 MPa gauge pressure, preferably ordinary pressure to 8 MPa gauge pressure. The polymerization reaction can be carried out by any of a batch process, a semicontinuous process and a continuous process. It is also possible to divide the polymerization into two or more stages different in reaction conditions.

When solution polymerization of an olefin is carried out using the olefin polymerization catalyst solution, the concentrations of the components (A) to (C) in the polymerization reactor depend upon each concentration of them in the olefin polymerization catalyst solution prepared by the aforesaid method, but the components are generally used in amounts in the following ranges.

The component (A) is used usually in an amount of $10^{-10}$ to $10^{-1}$ mol, preferably $10^{-9}$ to $10^{-2}$ mol, based on 1 liter of the reaction volume.

The component (B) is used in such an amount that the molar ratio [(B)/M] of the component (B) to a transition metal atom (M) in the component (A) usually becomes 1 to 50, preferably 1 to 20, particularly preferably 1 to 10.

The component (C) is used in such an amount that the molar ratio [Al/M] of an aluminum atom (Al) in the component (C) to a transition metal atom (M) in the component (A) usually becomes 10 to 5,000, preferably 20 to 2,000.

In the solution polymerization, an organoaluminum compound (C-1) (e.g., triisobutylaluminum, triethylaluminum) can be separately added to the polymerization reactor in addition to the component (C) used for the preparation of the olefin polymerization catalyst solution. The reaction solvent sometimes contains trace amounts of impurities that become catalyst poison, such as $H_2O$. By adding the organoaluminum compound (C-1) in a considerable amount, the catalyst poison can be removed, and deactivation of the catalyst can be further prevented.

The concentration of the separately added organoaluminum compound (C-1) in the reaction solvent during the solution polymerization is usually 0.001 to 2 mmol/L, preferably 0.005 to 1.5 mmol/L, more preferably about 0.01 to 1 mmol/L.

Examples of olefins applicable to the process for producing an olefin polymer of the present invention include ethylene, α-olefins of 3 to 20 carbon atoms (e.g., ethylene, propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene), cycloolefins of 3 to 20 carbon atoms (e.g., cyclopentene, cycloheptene, norbornene, 5-methyl-2-norbornene, tetracyclododecene and 2-methyl-1, 4,5,8-dimethano-1,2,3,4,4a,5,8,8a-octahydronaphthalene), styrene, vinylcyclohexane and diene.

The olefins may be used singly, or may be used in combination of two or more kinds.

The reaction solvent for use in the solution polymerization is preferably an inert hydrocarbon solvent and is more preferably a saturated hydrocarbon solvent having a boiling point of 20 to 200° C. at ordinary pressure, similarly to the aforesaid saturated hydrocarbon solvent (D).

As the reaction solvent, at least one hydrocarbon solvent selected from aliphatic hydrocarbon solvents and alicyclic hydrocarbon solvents is preferably used. Examples of the aliphatic hydrocarbon solvents include pentane, hexane, heptane, octane, decane, dodecane and kerosene. Examples of the alicyclic hydrocarbon solvents include cyclopentane, cyclohexane and methylcyclopentane. Of these, aliphatic hydrocarbon solvents, such as pentane, hexane, heptane, octane and decane, are more preferable.

If an aromatic hydrocarbon solvent or a halogenated hydrocarbon solvent is present in the system as the reaction solvent, the solvent can remain inside the resulting olefin polymer, so that such a solvent is undesirable from the viewpoints of environment burden, etc. Therefore, the amount of each of the aromatic hydrocarbon solvent and the halogenated hydrocarbon solvent is preferably not more than 10% by mass, more preferably not more than 5% by mass, based on the total amount of the reaction solvents. It is particularly preferable to use none of aromatic hydrocarbon solvents and halogenated hydrocarbon solvents.

The reaction solvents may be used singly, or may be used in combination of two or more kinds.

The molecular weight of the olefin polymer obtained in the present invention can be controlled by changing a hydrogen concentration in the polymerization reactor or a polymerization temperature, within the range in the present invention. The molecular weight thereof can be controlled also by the amounts of the component (B) and the compound (C) used. When hydrogen is added, the amount of hydrogen is suitably about 0.001 to 5,000 NL based on 1 kg of the olefin polymer produced.

EXAMPLES

The present invention will be more specifically described hereinafter on the basis of the following examples.

Measuring methods for various properties are as follows.

[Density]

Using a hydraulic hot press (manufactured by Shinto Metal Industries Corporation) preset at 190° C., a sheet having a thickness of 0.5 mm was produced from an olefin polymer obtained in each of the examples and the comparative examples at a pressure of 100 kg/cm² (spacer shape: comprising 9 openings (each: 45×45×0.5 mm) provided in a plate of 240×240×0.5 (thickness) mm). Using another hydraulic hot press (manufactured by Shinto Metal Industries Corporation) preset at 20° C., the sheet was compressed at a pressure of 100 kg/cm² to cool the sheet, whereby a test sample (pressed sheet) was prepared. As the hot plate, a SUS plate having a thickness of 5 mm was used. The test sample was heat-treated at 120° C. for 1 hour and linearly slowly cooled down to room temperature (25° C.) over a period of 1 hour. Thereafter, a density was measured by a density gradient tube.

[Melt Flow Rate (MFR)]

Melt flow rate (MFR) of an olefin polymer was measured at 190° C. under a load of 2.16 kg in accordance with a standard method of ASTM D-1238.

[Monomer Content]

Content of a monomer (ethylene (C2) or the like) in an olefin polymer was determined by analysis of IR or a $^{13}$C-NMR spectrum.

[Zr Concentration in Olefin Polymerization Catalyst Solution]

Zr concentration in an olefin polymerization catalyst solution was measured by plasma atomic emission spectrophotometry using an ICPS7500 device manufactured by Shimadzu Corporation.

[Boron Concentration in Olefin Polymerization Catalyst Solution]

Boron concentration in an olefin polymerization catalyst solution was determined in the following manner. By the analysis of a $^{19}$F-NMR spectrum using fluorobenzene as internal standard, an integral value of F in fluorobenzene and an integral value of F in the catalyst were determined, and the boron concentration was calculated from the F concentrations.

[Preparation of Catalyst Preparation Liquid (a1)]

In a 5-liter glass flask thoroughly purged with nitrogen, 4080 ml of hexane was placed, then 920 ml (corresponding to 500 mmol of triisobutylaluminum) of a hexane solution of triisobutylaluminum (C1) (0.54 mmol/ml) was added, and subsequently, 2.77 g (3 mmol) of triphenylcarbenium tetrakis (pentafluorophenyl)borate (B) was added, followed by stirring for 10 minutes. Thereafter, 0.805 g (1 mmol) of (p-tolyl) methylene(cyclopentadienyl) (octamethyloctahydrodibenzofluorenyl)zirconium dichloride (A1) was introduced, and the mixture was stirred for 3 hours to prepare a homogeneous solution. The zirconium concentration in the solution was 0.2 mmol/L, and the boron concentration was 0.59 mmol/L. The solution was introduced into a 110-liter catalyst preparation container, and 85 liters of hexane was added to prepare a catalyst preparation liquid (a1) to be used.

[Preparation of Catalyst Preparation Liquid (a2)]

In a glass flask thoroughly purged with nitrogen, 10.05 ml of hexane, 0.95 mL of a hexane solution of triisobutylaluminum (C1) (1 mol/L) and 1.9 mL of a hexane solution of di(p-tolyl)methylene(cyclopentadienyl)(octamethyloctahydrodibenzofluorenyl)zirconium dichloride (A1) (2 mmol/L) were placed, and they were stirred for 10 minutes. Thereafter, 7.6 mL of a hexane suspension of triphenylcarbenium tetrakis(pentafluorophenyl)borate (B) (1 mmol/L) was introduced, and the mixture was stirred for 2 hours to obtain a catalyst preparation liquid (a2).

[Preparation of Catalyst Preparation Liquid (a3)]

In a glass flask thoroughly purged with nitrogen, 3.4 ml of hexane, 3.8 mL of a hexane solution of triisobutylaluminum (C1) (1 mol/L) and 11.4 mL of a hexane suspension of triphenylcarbenium tetrakis(pentafluorophenyl)borate (B) (1 mmol/L) were placed, and they were stirred for 10 minutes. Thereafter, 1.9 mL of a hexane solution of di(p-tolyl)methylene(cyclopentadienyl)(octamethyloctahydrodibenzofluorenyl)zirconium dichloride (A1) (2 mmol/L) was introduced, and the mixture was stirred for 2 hours to obtain a catalyst preparation liquid (a3).

[Preparation of Catalyst Preparation Liquid (a4)]

In a glass flask thoroughly purged with nitrogen, 11.95 ml of hexane, 0.95 mL of a hexane solution of triisobutylaluminum (C1) (1 mol/L) and 1.9 mL of a hexane solution of di(p-tolyl)methylene(cyclopentadienyl)(octamethyloctahydrodibenzofluorenyl)zirconium dichloride (A1) (2 mmol/L) were placed, and they were stirred for 10 minutes. Thereafter, 5.7 mL of a hexane suspension of triphenylcarbenium tetrakis(pentafluorophenyl)borate (B) (1 mmol/L) was introduced, and the mixture was stirred for 2 hours to obtain a catalyst preparation liquid (a4).

[Preparation of Catalyst Preparation Liquid (a5)]

In a glass flask thoroughly purged with nitrogen, 7.2 ml of hexane, 3.8 mL of a hexane solution of trinormalhexylaluminum (C2) (1 mol/L) and 7.6 mL of a hexane suspension of triphenylcarbenium tetrakis(pentafluorophenyl)borate (B) (1 mmol/L) were placed, and they were stirred for 10 minutes. Thereafter, 1.9 mL of a hexane solution of di(p-tolyl)methylene(cyclopentadienyl)(octamethyloctahydrodibenzofluorenyl)zirconium dichloride (A1) (2 mmol/L) was introduced, and the mixture was stirred for 2 hours to obtain a catalyst preparation liquid (a5).

[Preparation of Catalyst Preparation Liquid (a6)]

A catalyst preparation liquid (a6) was obtained in the same manner as in [Preparation of catalyst preparation liquid (a5)], except that trinormalhexylaluminum (C2) was replaced with trinormaloctylaluminum (C3).

[Preparation of Catalyst Preparation Liquid (a7)]

In a glass flask thoroughly purged with nitrogen, 5.3 ml of hexane, 1.9 mL of a hexane solution of triisobutylaluminum (C1) (1 mol/L) and 1.9 mL of a hexane solution of di(p-tolyl)methylene(cyclopentadienyl)(octamethyloctahydrodibenzofluorenyl)zirconium dichloride (A1) (2 mmol/L) were placed, and they were stirred for 30 minutes. Thereafter, 11.4 mL of a hexane suspension of triphenylcarbenium tetrakis(pentafluorophenyl)borate (B) (1 mmol/L) was introduced, and the mixture was stirred for 2 hours to obtain a catalyst preparation liquid (a7).

[Preparation of Catalyst Preparation Liquid (a8)]

In a glass flask thoroughly purged with nitrogen, 7.5 ml of hexane, 1.5 mL of a hexane solution of triisobutylaluminum (C1) (1 mol/L) and 3.0 mL of a hexane solution of diphenylmethylene(cyclopentadienyl)(octamethyloctahydrodibenzofluorenyl)zirconium dichloride (A2) (1 mmol/L) were placed, and they were stirred for 10 minutes. Thereafter, 3.0 mL of a hexane suspension of triphenylcarbenium tetrakis(pentafluorophenyl)borate (B) (3 mmol/L) was introduced, and the mixture was stirred for 2 hours to obtain a catalyst preparation liquid (a8).

[Preparation of Catalyst Preparation Liquid (a9)]

A catalyst preparation liquid (a9) was obtained in the same manner as in [Preparation of catalyst preparation liquid (a8)], except that diphenylmethylene(cyclopentadienyl)(octamethyloctahydrodibenzofluorenyl)zirconium dichloride (A2) was replaced with diphenylmethylene(cyclopentadienyl)(3,6-di-tert-butylfluorenyl)zirconium dichloride (A3).

[Preparation of Catalyst Preparation Liquid (a10)]

In a glass flask thoroughly purged with nitrogen, 97.4 ml of hexane, 23 mL of a hexane solution of triisobutylaluminum (C1) (0.526 mol/L) and 7.9 mg (0.0121 mmol) of dimethylmethylene(cyclopentadienyl)(octamethyloctahydrodibenzofluorenyl)zirconium dichloride (A4) were placed, and they were stirred for 5 minutes. Thereafter, 12.1 mL of a hexane suspension of triphenylcarbenium tetrakis(pentafluorophenyl)borate (B) (3 mmol/L) was introduced, and the mixture was stirred for 3 hours to obtain a catalyst preparation liquid (a10).

[Preparation of Catalyst Preparation Liquid (a11)]

In a glass flask thoroughly purged with nitrogen, 110.70 ml of heptane, 6.15 mL of a heptane solution of triisobutylaluminum (C1) (1 mol/L) and 9.8 mg (0.0123 mmol) of diphenylsilylene(cyclopentadienyl)(octamethyloctahydrodibenzofluorenyl)zirconium dichloride (A5) were placed, and they were stirred for 5 minutes. Thereafter, 6.15 mL of a heptane suspension of triphenylcarbenium tetrakis(pentafluorophenyl)borate (B) (3 mmol/L) was introduced, and the mixture was stirred for 3 hours to obtain a catalyst preparation liquid (a11).

TABLE 1

| Catalyst preparation liquid | Component (A) | | Component (B) | Component (C) | | Saturated hydrocarbon solvent (D) | Condition (i) Amount of (A) added based on 1 L of (D) | Condition (ii) Molar ratio ((C)/(A)) | Condition (iii) Amount of (C) added based on 1 L of (D) | Condition (iv) Molar ratio ((B)/(A)) |
|---|---|---|---|---|---|---|---|---|---|---|
| | Type | mmol | mmol | Type | mmol | mL | mmol/L | — | mmol/L | — |
| a1 | A1 | 1 | 3 | C1 | 500 | 5000 | 0.2 | 500 | 100 | 3 |
| a2 | A1 | 0.0038 | 0.0076 | C1 | 0.95 | 20.5 | 0.185 | 250 | 46.3 | 2 |
| a3 | A1 | 0.0038 | 0.0114 | C1 | 3.8 | 20.5 | 0.185 | 1000 | 185.4 | 3 |
| a4 | A1 | 0.0038 | 0.0057 | C1 | 0.95 | 20.5 | 0.185 | 250 | 46.3 | 1.5 |

TABLE 1-continued

| Catalyst preparation liquid | Component (A) | | Component (B) | Component (C) | | Saturated hydrocarbon solvent (D) | Condition (i) Amount of (A) added based on 1 L of (D) | Condition (ii) Molar ratio ((C)/(A)) | Condition (iii) Amount of (C) added based on 1 L of (D) | Condition (iv) Molar ratio ((B)/(A)) |
|---|---|---|---|---|---|---|---|---|---|---|
| | Type | mmol | mmol | Type | mmol | mL | mmol/L | — | mmol/L | — |
| a5  | A1 | 0.0038 | 0.0076  | C2 | 3.8   | 20.5  | 0.185 | 1000 | 185.4 | 2 |
| a6  | A1 | 0.0038 | 0.0076  | C3 | 3.8   | 20.5  | 0.185 | 1000 | 185.4 | 2 |
| a7  | A1 | 0.0038 | 0.0114  | C1 | 1.9   | 20.5  | 0.185 | 500  | 92.7  | 3 |
| a8  | A2 | 0.003  | 0.009   | C1 | 1.5   | 15    | 0.2   | 500  | 100   | 3 |
| a9  | A3 | 0.003  | 0.009   | C1 | 1.5   | 15    | 0.2   | 500  | 100   | 3 |
| a10 | A4 | 0.0121 | 0.0363  | C3 | 12.1  | 132.5 | 0.091 | 1000 | 91.3  | 3 |
| a11 | A5 | 0.0123 | 0.01845 | C3 | 6.15  | 123   | 0.100 | 500  | 50.0  | 1.5 |

Component (A)
A1: di(p-tolyl)methylene(cyclopentadienyl)(octamethyloctahydrodibenzofluorenyl)zirconium dichloride
A2: diphenylmethylene(cyclopentadienyl)(octamethyloctahydrodibenzofluorenyl)zirconium dichloride
A3: diphenylmethylene(cyclopentadienyl)(3,6-di-tert-butylfluorenyl)zirconium dichloride
A4: dimethylmethylene(cyclopentadienyl)(octamethyloctahydrodibenzofluorenyl)zirconium dichloride
A5: diphenylsilylene(cyclopentadienyl)(octamethyloctahydrodibenzofluorenyl)zirconium dichloride
Component (B): triphenylcarbenium tetrakis(pentafluorophenyl)borate
Component (C)
C1: triisobutylaluminum
C2: trinormalhexylaluminum
C3: trinormaloctylaluminum Example 1

Using a polymerization vessel having a volume of 300 liters and equipped with a stirring blade, polymerization for a bipolymer of ethylene and butene was continuously carried out at a temperature of 90° C. Specifically, hexane (feed rate: 10.7 kg/h) was used as a polymerization solvent, and to the polymerization vessel were continuously fed ethylene at a feed rate of 4.8 kg/h, butene at a feed rate of 5.4 kg/h and hydrogen at a feed rate of 10 normal liters/h. With maintaining the polymerization pressure at 1.5 MPa-G, the catalyst preparation liquid (a1) prepared above was continuously fed to the polymerization vessel so that the feed rate might become 0.05 liter/h. Further, as an organoaluminum compound, triisobutylaluminum was separately fed to the polymerization vessel so that the feed rate might become 8 mmol/h.

Thus, a polymer solution containing 21.8% by weight of an ethylene/butene copolymer (A1) was obtained. The catalytic activity was 9400 kg/mmol-M·h. The resulting polymer solution was introduced into a large amount of methanol to precipitate the ethylene/butene copolymer (A1), and thereafter, the copolymer was subjected to vacuum drying at 80° C. for 24 hours. Properties of the resulting copolymer (A1) are set forth in Table 2.

The above polymerization was continuously carried out for 2 days in total, and the interior of the polymerization vessel was confirmed. As a result, adhesion of a polymer to the polymerization vessel wall or the stirring blade attributable to precipitation of a polymer was not observed.

Example 2

Using a polymerization vessel having a volume of 300 liters and equipped with a stirring blade, polymerization for a bipolymer of ethylene and butene was continuously carried out at a temperature of 90° C. Specifically, hexane (feed rate: 8.3 kg/h) was used as a polymerization solvent, and to the polymerization vessel were continuously fed ethylene at a feed rate of 4.8 kg/h, butene at a feed rate of 7.9 kg/h and hydrogen at a feed rate of 43 normal liters/h. With maintaining the polymerization pressure at 2.5 MPa-G, the catalyst preparation liquid (a1) prepared above was continuously fed to the polymerization vessel so that the feed rate might become 0.03 liter/h. Further, as an organoaluminum compound, triisobutylaluminum was separately fed to the polymerization vessel so that the feed rate might become 8 mmol/h.

Thus, a polymer solution containing 19% by weight of an ethylene/butene copolymer (A2) was obtained. The catalytic activity was 15000 kg/mmol-M·h. The resulting polymer solution was introduced into a large amount of methanol to precipitate the ethylene/butene copolymer (A2), and thereafter, the copolymer was subjected to vacuum drying at 80° C. for 24 hours. Properties of the resulting copolymer (A2) are set forth in Table 2.

The above polymerization was continuously carried out for 2 days in total, and the interior of the polymerization vessel was confirmed. As a result, adhesion of a polymer to the polymerization vessel wall or the stirring blade attributable to precipitation of a polymer was not observed.

Comparative Example 1

Using a polymerization vessel having a volume of 300 liters and equipped with a stirring blade, polymerization for a bipolymer of ethylene and butene was continuously carried out at a temperature of 90° C. Specifically, hexane (feed rate: 19.3 kg/h) was used as a polymerization solvent, and to the polymerization vessel were continuously fed ethylene at a feed rate of 3.6 kg/h, butene at a feed rate of 8.5 kg/h and hydrogen at a feed rate of 10 normal liters/h. With maintaining the polymerization pressure at 1.5 MPa-G, a hexane solution of (p-tolyl)methylene(cyclopentadienyl)(octamethyloctahydrodibenzofluorenyl)zirconium dichloride (as a main catalyst) (0.01 mmol/L) was continuously fed to the polymerization vessel so that the feed rate might become 0.001 mmol/h. Further, a hexane slurry of triphenylcarbenium tetrakis(pentafluorophenyl)borate (as a cocatalyst) (0.0025 mmol/L) was continuously fed to the polymerization vessel so that the feed rate might become 0.005 mmol/h, and a hexane solution of triisobutylaluminum (as an organoaluminum compound) (5 mmol/L) was continuously fed to the polymerization vessel so that the feed rate might become 7 mmol/h.

Thus, a polymer solution containing 9.5% by weight of an ethylene/butene copolymer (A3) was obtained. The catalytic activity was 6100 kg/mmol-M·h. The resulting polymer solution was introduced into a large amount of methanol to precipitate the ethylene/butene copolymer (A3), and thereafter, the copolymer was subjected to vacuum drying at 80° C. for 24 hours. Properties of the resulting copolymer (A3) are set forth in Table 2.

The above polymerization was continuously carried out for 2 days in total, and the interior of the polymerization vessel was confirmed. As a result, a high-ethylene content polymer having an ethylene content of 97% by mol adhered to the polymerization vessel wall and also adhered to the stirring blade like cobwebs.

Comparative Example 2

Using a polymerization vessel having a volume of 300 liters and equipped with a stirring blade, polymerization for a bipolymer of ethylene and butene was continuously carried out at a temperature of 90° C. Specifically, hexane (feed rate: 12.3 kg/h) was used as a polymerization solvent, and to the polymerization vessel were continuously fed ethylene at a feed rate of 4.9 kg/h, butene at a feed rate of 11 kg/h and hydrogen at a feed rate of 11 normal liters/h. With maintaining the polymerization pressure at 2.5 MPa-G, a hexane solution of (p-tolyl)methylene(cyclopentadienyl)(octamethyloctahydrodibenzofluorenyl)zirconium dichloride (as a main catalyst) (0.01 mmol/L) was continuously fed to the polymerization vessel so that the feed rate might become 0.00065 mmol/h. Further, a hexane slurry of triphenylcarbenium tetrakis(pentafluorophenyl)borate (as a cocatalyst) (0.0025 mmol/L) was fed to the polymerization vessel so that the feed rate might become 0.00325 mmol/h, and a hexane solution of triisobutylaluminum (as an organoaluminum compound) (5 mmol/L) was continuously fed to the polymerization vessel so that the feed rate might become 7 mmol/h.

Thus, a polymer solution containing 13.9% by weight of an ethylene/butene copolymer (A4) was obtained. The catalytic activity was 11000 kg/mmol-M·h. The resulting polymer solution was introduced into a large amount of methanol to precipitate the ethylene/butene copolymer (A4), and thereafter, the copolymer was subjected to vacuum drying at 80° C. for 24 hours. Properties of the resulting copolymer (A4) are set forth in Table 2.

The above polymerization was continuously carried out for 2 days in total, and the interior of the polymerization vessel was confirmed. As a result, a high-ethylene content polymer having an ethylene content of 97% by mol adhered to the polymerization vessel wall and also adhered to the stirring blade like cobwebs.

Example 3

In a stainless steel autoclave having an internal volume of 2 liters and having been thoroughly purged with nitrogen, 1000 mL of heptane was introduced, and the temperature of the system was raised to 89° C. Thereafter, 100 mL of hydrogen was introduced and ethylene was fed to set the total pressure at 3 MPa-G.

Subsequently, 0.3 mmol of triisobutylaluminum and 0.108 ml (0.02 µmol in terms of zirconium atom calculated from the amount fed during the catalyst preparation) of the catalyst preparation liquid (a2) were forcedly introduced with nitrogen, and the number of rotations for stirring was set to 400 rpm, whereby polymerization was initiated.

Thereafter, ethylene was continuously fed to maintain the total pressure at 3 MPa-G, and the polymerization was carried out at 90° C. for 10 minutes. A small amount of ethanol was added to the system to terminate the polymerization, and then, unreacted ethylene was purged out.

From the resulting polymer solution, the solvent was distilled off to concentrate the solution, and thereafter, the residue was dried at 130° C. for 12 hours under reduced pressure. As a result, 14.4 g of an ethylene polymer was obtained. The density of the resulting polymer was 947 kg/m³, and MFR thereof was 0.14 g/10 min.

Comparative Example 3

1.9 g of an ethylene polymer was obtained by carrying out polymerization of ethylene in the same manner as in Example 3, except that instead of 0.3 mmol of triisobutylaluminum and 0.108 ml (0.02 µmol in terms of zirconium atom) of the catalyst preparation liquid (a2), 0.1 mL (0.02 µmol in terms of zirconium atom) of a hexane solution of di(p-tolyl)methylene (cyclopentadienyl)(octamethyloctahydrodibenzofluorenyl) zirconium dichloride (0.2 mmol/L), 0.2 mL (0.04 µmol in terms of boron atom) of a hexane suspension of triphenylcarbenium tetrakis(pentafluorophenyl)borate (0.2 mmol/L) and 0.305 mmol of triisobutylaluminum were each forcedly introduced with nitrogen. MFR of the resulting polymer was 0.12 g/10 min. The density could not be measured because the amount of the sample was small.

Example 4

In a stainless steel autoclave having an internal volume of 2 liters and having been thoroughly purged with nitrogen, 700 mL of heptane and 300 mL of 1-octene were introduced, and the temperature of the system was raised to 145° C. Thereafter, 700 mL of hydrogen was introduced and ethylene was fed to set the total pressure at 3 MPa-G.

Subsequently, 0.3 mmol of triisobutylaluminum and 0.43 ml (0.08 µmol in terms of zirconium atom calculated from the amount fed during the catalyst preparation) of the catalyst

TABLE 2

| | Catalyst | Catalytic activity kg/mmol-M·h | Density kg/m³ | MFR g/10 min | Ethylene content mol % | State in polymerization vessel |
|---|---|---|---|---|---|---|
| Ex. 1 | catalyst preparation liquid a1 | 9,400 | 863 | 1.3 | 81.7 | adhesion of no polymer |
| Ex. 2 | catalyst preparation liquid a1 | 15,000 | 865 | 1.1 | 82.3 | adhesion of no polymer |
| Comp. Ex. 1 | successive addition of components | 6,100 | 860 | 0.4 | 80.6 | adhesion of polymer to wall/stirring blade |
| Comp. Ex. 2 | successive addition of components | 11,000 | 862 | 0.4 | 80.7 | adhesion of polymer to wall/stirring blade | preparation liquid (a3) were forcibly introduced with nitrogen, and the number of rotations for stirring was set to 400 rpm, whereby polymerization was initiated.

Thereafter, only ethylene was continuously fed to maintain the total pressure at 3 MPa-G, and the polymerization was carried out at 150° C. for 10 minutes. A small amount of ethanol was added to the system to terminate the polymerization, and then, unreacted ethylene was purged out.

From the resulting polymer solution, the solvent and unreacted 1-octene were distilled off to concentrate the solution, and thereafter, the residue was dried at 130° C. for 12 hours under reduced pressure. As a result, 125.1 g of an ethylene/1-octene copolymer was obtained. The density of the resulting copolymer was 897 kg/m$^3$, and MFR thereof was 2.05 g/10 min.

Example 5

Polymerization was carried out in the same manner as in Example 4, except that instead of the catalyst preparation liquid (a3), the catalyst preparation liquid (a4) was used.

under reduced pressure. As a result, 105.0 g of an ethylene/1-octene copolymer was obtained. The density of the resulting copolymer was 897 kg/m$^3$, and MFR thereof was 1.70 g/10 min.

Example 8

Polymerization was carried out in the same manner as in Example 4, except that instead of the catalyst preparation liquid (a3), the catalyst preparation liquid (a7) was used.

From the resulting polymer solution, the solvent and unreacted 1-octene were distilled off to concentrate the solution, and thereafter, the residue was dried at 130° C. for 12 hours under reduced pressure. As a result, 112.6 g of an ethylene/1-octene copolymer was obtained. The density of the resulting copolymer was 897 kg/m$^3$, and MFR thereof was 1.50 g/10 min.

TABLE 3

| | Catalyst | Component (A) μmol | Molar ratio (B)/(A) | Yield g | Catalytic activity kg/mmol-Zr | Density kg/m$^3$ | MFR g/10 min |
|---|---|---|---|---|---|---|---|
| Ex. 3 | catalyst preparation liquid a2 | 0.02 | 2 | 14.4 | 720 | 947 | 0.14 |
| Comp. Ex. 3 | successive addition of components | 0.02 | 2 | 1.9 | 95 | unmeasurable *1 | 0.12 |
| Ex. 4 | catalyst preparation liquid a3 | 0.08 | 3 | 125.1 | 1564 | 897 | 2.05 |
| Ex. 5 | catalyst preparation liquid a4 | 0.08 | 1.5 | 108.9 | 1361 | 896 | 1.75 |
| Ex. 6 | catalyst preparation liquid a5 | 0.08 | 2 | 109.5 | 1369 | 897 | 1.8 |
| Ex. 7 | catalyst preparation liquid a6 | 0.08 | 1.5 | 105 | 1313 | 897 | 1.7 |
| Ex. 8 | catalyst preparation liquid a7 | 0.08 | 3 | 112.6 | 1408 | 897 | 1.5 |

*1: unmeasurable because of small amount

From the resulting polymer solution, the solvent and unreacted 1-octene were distilled off to concentrate the solution, and thereafter, the residue was dried at 130° C. for 12 hours under reduced pressure. As a result, 108.9 g of an ethylene/1-octene copolymer was obtained. The density of the resulting copolymer was 896 kg/m$^3$, and MFR thereof was 1.75 g/10 min.

Example 6

Polymerization was carried out in the same manner as in Example 4, except that instead of the catalyst preparation liquid (a3), the catalyst preparation liquid (a5) was used.

From the resulting polymer solution, the solvent and unreacted 1-octene were distilled off to concentrate the solution, and thereafter, the residue was dried at 130° C. for 12 hours under reduced pressure. As a result, 109.5 g of an ethylene/1-octene copolymer was obtained. The density of the resulting copolymer was 897 kg/m$^3$, and MFR thereof was 1.80 g/10 min.

Example 7

Polymerization was carried out in the same manner as in Example 4, except that instead of the catalyst preparation liquid (a3), the catalyst preparation liquid (a6) was used.

From the resulting polymer solution, the solvent and unreacted 1-octene were distilled off to concentrate the solution, and thereafter, the residue was dried at 130° C. for 12 hours Example 9

In a glass autoclave having an internal volume of 500 ml and having been thoroughly purged with nitrogen, 300 ml of hexane was introduced, then ethylene and propylene were passed at rates of 50 L/h and 25 L/h, respectively, and the system was maintained at 30° C. for 20 minutes. To the system, 0.3 mmol of triisobutylaluminum and 3 ml (0.6 μmol in terms of zirconium atom calculated from the amount fed during the catalyst preparation) of the catalyst preparation liquid (a8) were added, and the number of rotations for stirring was set to 650 rpm, whereby polymerization was initiated. During the polymerization, ethylene and propylene were continuously fed at rates of 50 L/h and 25 L/h, respectively, and the polymerization was carried out for 12 minutes. Thereafter, a small amount of methanol was added to terminate the polymerization. The polymer solution was added to a large excess of methanol to precipitate a polymer, and the polymer was subjected to vacuum drying at 80° C. for 12 hours. As a result, 2.15 g of a polymer was obtained.

Comparative Example 4

0.63 g of a polymer was obtained by carrying out polymerization in the same manner as in Example 9, except that instead of 0.3 mmol of triisobutylaluminum and 3 ml (0.6 μmol in terms of zirconium atom) of the catalyst preparation liquid (a8), dimethylmethylene(cyclopentadienyl)(octamethyloctahydrodibenzofluorenyl) zirconium dichloride (0.6 μmol in terms of zirconium atom), 1.8 μmol of triphenylcarbenium tetrakis(pentafluorophenyl)borate and 0.6 mmol of triisobutylaluminum were each added.

Example 10

In a glass autoclave having an internal volume of 500 ml and having been thoroughly purged with nitrogen, 300 ml of hexane was introduced, then 10 ml of 1-octene was introduced, and with passing ethylene at a rate of 60 L/h, the temperature was set at 30° C. To the system, 0.3 mmol of triisobutylaluminum and 4 ml (0.8 µmol in terms of zirconium atom calculated from the amount fed during the catalyst preparation) of the catalyst preparation liquid (a9) were added, and the number of rotations for stirring was set to 650 rpm, whereby polymerization was initiated. During the polymerization, ethylene was continuously fed at a rate of 60 L/h, and the polymerization was carried out for 12 minutes. Thereafter, a small amount of methanol was added to terminate the polymerization. The polymer solution was added to a large excess of methanol to precipitate a polymer, and the polymer was subjected to vacuum drying at 80° C. for 12 hours. As a result, 6.00 g of a polymer was obtained.

Comparative Example 5

2.03 g of a polymer was obtained by carrying out polymerization in the same manner as in Example 10, except that instead of 0.3 mmol of triisobutylaluminum and 4 ml (0.8 µmol in terms of zirconium atom) of the catalyst preparation liquid (a9), diphenylmethylene(cyclopentadienyl)(3,6-di-tert-butylfluorenyl)zirconium dichloride (0.8 µmol in terms of zirconium atom), 2.4 µmol of triphenylcarbenium tetrakis(pentafluorophenyl)borate and 0.7 mmol of triisobutylaluminum were each added.

Example 11

In a glass autoclave having an internal volume of 500 ml and having been thoroughly purged with nitrogen, 300 ml of heptane was introduced, then 10 ml of 1-hexene was introduced, and with passing ethylene at a rate of 60 L/h, the temperature was set at 40° C. To the system, 0.3 mmol of triisobutylaluminum and 7.9 ml (0.6 µmol in terms of zirconium atom calculated from the amount fed during the catalyst preparation) of the catalyst preparation liquid (a10) were added, and the number of rotations for stirring was set to 650 rpm, whereby polymerization was initiated. During the polymerization, ethylene was continuously fed at a rate of 60 L/h, and the polymerization was carried out for 8 minutes. Thereafter, a small amount of methanol was added to terminate the polymerization. The polymer solution was added to a large excess of methanol to precipitate a polymer, and the polymer was subjected to vacuum drying at 80° C. for 12 hours. As a result, 8.17 g of a polymer was obtained.

Example 12

In a glass autoclave having an internal volume of 500 ml and having been thoroughly purged with nitrogen, 300 ml of heptane was introduced, then 5 ml of 1-octene was introduced, and with passing ethylene at a rate of 60 L/h, the temperature was set at 40° C. To the system, 0.3 mmol of triisobutylaluminum and 9.8 ml (0.6 µmol in terms of zirconium atom calculated from the amount fed during the catalyst preparation) of the catalyst preparation liquid (a11) were added, and the number of rotations for stirring was set to 650 rpm, whereby polymerization was initiated. During the polymerization, ethylene was continuously fed at a rate of 60 L/h, and the polymerization was carried out for 3 minutes. Thereafter, a small amount of methanol was added to terminate the polymerization. The polymer solution was added to a large excess of methanol to precipitate a polymer, and the polymer was subjected to vacuum drying at 80° C. for 12 hours. As a result, 3.38 g of a polymer was obtained.

TABLE 4

| | Catalyst | Component (A) µmol | Molar ratio (B)/(A) | Yield g | Catalytic activity kg/mmol-Zr |
|---|---|---|---|---|---|
| Ex. 9 | catalyst preparation liquid a8 | 0.6 | 3 | 2.15 | 3.6 |
| Comp. Ex. 4 | successive addition of components | 0.6 | 3 | 0.63 | 1.1 |
| Ex. 10 | catalyst preparation liquid a9 | 0.8 | 3 | 6 | 7.5 |
| Comp. Ex. 5 | successive addition of components | 0.8 | 3 | 2.03 | 2.5 |
| Ex. 11 | catalyst preparation liquid a10 | 0.8 | 3 | 8.17 | 10.2 |
| Ex. 12 | catalyst preparation liquid a11 | 0.6 | 3 | 3.38 | 5.6 |

[Preparation of Catalyst Preparation Liquid (a12)]

In a glass flask thoroughly purged with nitrogen, 147.12 ml of hexane, 1.38 mL of a hexane solution of triisobutylaluminum (C1) (0.543 mol/L) and 0.75 mL of a hexane solution of di(p-tolyl)methylene(cyclopentadienyl)(octamethyloctahydrodibenzofluorenyl)zirconium dichloride (A1) (2 mmol/L) were placed, and they were stirred for 20 minutes. Thereafter, 0.75 mL of a hexane suspension of triphenylcarbenium tetrakis(pentafluorophenyl)borate (B) (3 mmol/L) was introduced, and the mixture was stirred for 3 hours to obtain a catalyst preparation liquid (a12). In this catalyst preparation liquid, however, a solid remaining undissolved, which seemed to be the component (B), was observed.

[Preparation of Catalyst Preparation Liquid (a13)]

In a glass flask thoroughly purged with nitrogen, 143.92 ml of hexane, 0.83 mL of a hexane solution of triisobutylaluminum (C1) (0.543 mol/L) and 2.25 mL of a hexane solution of di(p-tolyl)methylene(cyclopentadienyl)(octamethyloctahydrodibenzofluorenyl)zirconium dichloride (A1) (2 mmol/L) were placed, and they were stirred for 20 minutes. Thereafter, 3.00 mL of a hexane suspension of triphenylcarbenium tetrakis(pentafluorophenyl)borate (B) (3 mmol/L) was introduced, and the mixture was stirred for 3 hours to obtain a catalyst preparation liquid (a13).

[Preparation of Catalyst Preparation Liquid (a14)]

In a glass flask thoroughly purged with nitrogen, 91.48 ml of hexane, 28.52 mL of a hexane solution of triisobutylaluminum (C1) (0.526 mol/L) and 15.00 mL of a hexane solution of di(p-tolyl)methylene(cyclopentadienyl)(octamethyloctahydrodibenzofluorenyl)zirconium dichloride (A1) (2 mmol/L) were placed, and they were stirred for 20 minutes. Thereafter, 15.00 mL of a hexane suspension of triphenylcarbenium tetrakis(pentafluorophenyl)borate (B) (3 mmol/L) was introduced, and the mixture was stirred for 3 hours to obtain a catalyst preparation liquid (a14).

[Preparation of Catalyst Preparation Liquid (a15)]

In a glass flask thoroughly purged with nitrogen, 91.48 ml of hexane, 28.52 mL of a hexane solution of triisobutylaluminum (C1) (0.526 mol/L) and 15.00 mL of a hexane solution of di(p-tolyl)methylene(cyclopentadienyl)(octamethyloctahydrodibenzofluorenyl)zirconium dichloride (A1) (2 mmol/L) were placed, and they were stirred for 120 minutes.

Thereafter, 15.00 mL of a hexane suspension of triphenylcarbenium tetrakis(pentafluorophenyl)borate (B) (3 mmol/L) was introduced, and the mixture was stirred for 3 hours to obtain a catalyst preparation liquid (a15).

[Preparation of Catalyst Preparation Liquid (a16)]

In a glass flask thoroughly purged with nitrogen, 32.00 ml of hexane, 24.00 mL of a hexane solution of triisobutylaluminum (C1) (1 mol/L) and 24.00 mL of a hexane solution of di(p-tolyl)methylene(cyclopentadienyl)(octamethyloctahydrodibenzofluorenyl)zirconium dichloride (A1) (2 mmol/L) were placed, and they were stirred for 20 minutes. Thereafter, 0.1328 g of triphenylcarbenium tetrakis(pentafluorophenyl)borate (B) was introduced, and the mixture was stirred for 4 hours to obtain a catalyst preparation liquid (a16).

[Preparation of Catalyst Preparation Liquid (a17)]

In a glass flask thoroughly purged with nitrogen, 55.50 mL of a hexane solution of triisobutylaluminum (C1) (1 mol/L) and 55.50 mL of a hexane solution of di(p-tolyl)methylene(cyclopentadienyl)(octamethyloctahydrodibenzofluorenyl)zirconium dichloride (A1) (2 mmol/L) were placed, and they were stirred for 20 minutes. Thereafter, 0.1536 g of triphenylcarbenium tetrakis(pentafluorophenyl)borate (B) was introduced, and the mixture was stirred for 4 hours to obtain a catalyst preparation liquid (a17). In this catalyst preparation liquid, however, precipitation of a green solid, which was apparently different from the component (B) and seemed to be an active species, was observed

[Preparation of Catalyst Preparation Liquid (a18)]

In a glass flask thoroughly purged with nitrogen, 131.64 ml of hexane, 0.86 mL of a hexane solution of triisobutylaluminum (C1) (0.526 mol/L) and 7.50 mL of a hexane solution of di(p-tolyl)methylene(cyclopentadienyl)(octamethyloctahydrodibenzofluorenyl)zirconium dichloride (A1) (2 mmol/L) were placed, and they were stirred for 20 minutes. Thereafter, 10.00 mL of a hexane suspension of triphenylcarbenium tetrakis(pentafluorophenyl)borate (B) (3 mmol/L) was introduced, and the mixture was stirred for 4 hours to obtain a catalyst preparation liquid (a18). In this catalyst preparation liquid, however, a solid remaining undissolved, which seemed to be the component (B), was observed.

[Preparation of Catalyst Preparation Liquid (a19)]

In a glass flask thoroughly purged with nitrogen, 45.83 ml of hexane, 55.00 mL of a hexane solution of triisobutylaluminum (C1) (1 mol/L) and 5.50 mL of a hexane solution of di(p-tolyl)methylene(cyclopentadienyl)(octamethyloctahydrodibenzofluorenyl)zirconium dichloride (A1) (2 mmol/L) were placed, and they were stirred for 20 minutes. Thereafter, 3.67 mL of a hexane suspension of triphenylcarbenium tetrakis(pentafluorophenyl)borate (B) (3 mmol/L) was introduced, and the mixture was stirred for 3 hours to obtain a catalyst preparation liquid (a19).

[Preparation of Catalyst Preparation Liquid (a20)]

In a glass flask thoroughly purged with nitrogen, 194.05 ml of hexane, 0.95 mL of a hexane solution of triisobutylaluminum (C1) (0.526 mol/L) and 2.50 mL of a hexane solution of di(p-tolyl)methylene(cyclopentadienyl)(octamethyloctahydrodibenzofluorenyl)zirconium dichloride (A1) (2 mmol/L) were placed, and they were stirred for 20 minutes. Thereafter, 2.50 mL of a hexane suspension of triphenylcarbenium tetrakis(pentafluorophenyl)borate (B) (3 mmol/L) was introduced, and the mixture was stirred for 4 hours to obtain a catalyst preparation liquid (a20). In this catalyst preparation liquid, however, a solid remaining undissolved, which seemed to be the component (B), was observed.

[Preparation of Catalyst Preparation Liquid (a21)]

In a glass flask thoroughly purged with nitrogen, 60.00 mL of a hexane solution of triisobutylaluminum (C1) (1 mol/L) and 24.2 mg of di(p-tolyl)methylene(cyclopentadienyl)(octamethyloctahydrodibenzofluorenyl)zirconium dichloride (A1) were placed, and they were stirred for 20 minutes. Thereafter, 83.0 mg of triphenylcarbenium tetrakis(pentafluorophenyl)borate (B) was introduced, and the mixture was stirred for 5 hours to obtain a catalyst preparation liquid (a21).

[Preparation of Catalyst Preparation Liquid (a22)]

In a glass flask thoroughly purged with nitrogen, 78.83 ml of hexane, 22.00 mL of a hexane solution of triisobutylaluminum (C1) (1 mol/L) and 5.50 mL of a hexane solution of di(p-tolyl)methylene(cyclopentadienyl)(octamethyloctahydrodibenzofluorenyl)zirconium dichloride (A1) (2 mmol/L) were placed, and they were stirred for 20 minutes. Thereafter, 3.67 mL of a hexane suspension of triphenylcarbenium tetrakis(pentafluorophenyl)borate (B) (3 mmol/L) was introduced, and the mixture was stirred for 4 hours to obtain a catalyst preparation liquid (a22).

[Preparation of Catalyst Preparation Liquid (a23)]

In a glass flask thoroughly purged with nitrogen, 28.43 ml of hexane, 114.07 mL of a hexane solution of triisobutylaluminum (C1) (0.526 mol/L) and 7.50 mL of a hexane solution of di(p-tolyl)methylene(cyclopentadienyl)(octamethyloctahydrodibenzofluorenyl)zirconium dichloride (A1) (2 mmol/L) were placed, and they were stirred for 20 minutes. Thereafter, 0.2075 g of triphenylcarbenium tetrakis(pentafluorophenyl)borate (B) was introduced, and the mixture was stirred for 5 hours to obtain a catalyst preparation liquid (a23).

[Preparation of Catalyst Preparation Liquid (a24)]

In a glass flask thoroughly purged with nitrogen, 28.43 ml of hexane, 114.07 mL of a hexane solution of triisobutylaluminum (C1) (0.526 mol/L) and 7.50 mL of a hexane solution of di(p-tolyl)methylene(cyclopentadienyl)(octamethyloctahydrodibenzofluorenyl)zirconium dichloride (A1) (2 mmol/L) were placed, and they were stirred for 20 minutes. Thereafter, 0.4151 g of triphenylcarbenium tetrakis(pentafluorophenyl)borate (B) was introduced, and the mixture was stirred for 5 hours to obtain a catalyst preparation liquid (a24). In this catalyst preparation liquid, however, a solid remaining undissolved, which seemed to be the component (B), was observed.

TABLE 5

| Catalyst preparation liquid | Component (A) | | Component (B) | Component (C) | | Saturated hydrocarbon solvent (D) | Condition (i) Amount of (A) added based on 1 L of (D) | Condition (ii) Molar ratio ((C)/(A)) | Condition (iii) Amount of (C) added based on 1 L of (D) | Condition (iv) Molar ratio ((B)/(A)) | Presence of solid in solution |
|---|---|---|---|---|---|---|---|---|---|---|---|
| | Type | mmol | mmol | Type | mmol | mL | mmol/L | — | mmol/L | — | |
| a12 | A1 | 0.0015 | 0.00225 | C1 | 0.75 | 150 | 0.010 | 500 | 5.0 | 1.5 | yes |
| a13 | A1 | 0.0045 | 0.009 | C1 | 0.45 | 150 | 0.030 | 100 | 3.0 | 2 | no |

TABLE 5-continued

| Catalyst preparation liquid | Component (A) Type | Component (A) mmol | Component (B) mmol | Component (C) Type | Component (C) mmol | Saturated hydrocarbon solvent (D) mL | Condition (i) Amount of (A) added based on 1 L of (D) mmol/L | Condition (ii) Molar ratio ((C)/(A)) — | Condition (iii) Amount of (C) added based on 1 L of (D) mmol/L | Condition (iv) Molar ratio ((B)/(A)) — | Presence of solid in solution |
|---|---|---|---|---|---|---|---|---|---|---|---|
| a14 | A1 | 0.03 | 0.045 | C1 | 15 | 150 | 0.200 | 500 | 100.0 | 1.5 | no |
| a15 | A1 | 0.03 | 0.045 | C1 | 15 | 150 | 0.200 | 500 | 100.0 | 1.5 | no |
| a16 | A1 | 0.048 | 0.144 | C1 | 24 | 80 | 0.600 | 500 | 300.0 | 3 | no |
| a17 | A1 | 0.111 | 0.1665 | C1 | 55.5 | 111 | 1.000 | 500 | 500.0 | 1.5 | yes |
| a18 | A1 | 0.015 | 0.03 | C1 | 0.45 | 150 | 0.100 | 30 | 3.0 | 2 | yes |
| a19 | A1 | 0.011 | 0.011 | C1 | 55 | 110 | 0.100 | 5000 | 500.0 | 1 | no |
| a20 | A1 | 0.005 | 0.0075 | C1 | 0.5 | 200 | 0.025 | 100 | 2.5 | 1.5 | yes |
| a21 | A1 | 0.03 | 0.09 | C1 | 60 | 60 | 0.500 | 2000 | 1000.0 | 3 | no |
| a22 | A1 | 0.011 | 0.011 | C1 | 22 | 110 | 0.100 | 2000 | 200.0 | 1 | no |
| a23 | A1 | 0.015 | 0.225 | C1 | 60 | 150 | 0.100 | 4000 | 400.0 | 15 | no |
| a24 | A1 | 0.015 | 0.45 | C1 | 60 | 150 | 0.100 | 4000 | 400.0 | 30 | yes |

Component (A) A1: di(p-tolyl)methylene(cyclopentadienyl)(octamethyloctahydrodibenzofluorenyl)zirconium dichloride
Component (B): triphenylcarbenium tetrakis(pentafluorophenyl)borate
Component (C) C1: triisobutylaluminum Example 13

In a glass autoclave having an internal volume of 500 ml and having been thoroughly purged with nitrogen, 300 ml of heptane was introduced, then 10 ml of 1-octene was introduced, and with passing ethylene at a rate of 60 L/h, the temperature was set at 40° C. To the system, 0.3 mmol of triisobutylaluminum and 2 ml (0.4 μmol in terms of zirconium atom calculated from the amount fed during the catalyst preparation) of the catalyst preparation liquid (a14) were added, and the number of rotations for stirring was set to 650 rpm, whereby polymerization was initiated. During the polymerization, ethylene was continuously fed at a rate of 60 L/h, and the polymerization was carried out for 6 minutes. Thereafter, a small amount of methanol was added to terminate the polymerization. The polymer solution was added to a large excess of methanol to precipitate a polymer, and the polymer was subjected to vacuum drying at 80° C. for 12 hours. As a result, 3.74 g of a polymer was obtained.

Example 14

3.69 g of a polymer was obtained by carrying out polymerization in the same manner as in Example 13, except that instead of 2 ml (0.4 μmol in terms of zirconium atom) of the catalyst preparation liquid (a14), 2 ml (0.4 μmol in terms of zirconium atom) of the catalyst preparation liquid (a15) was added.

Comparative Example 6

0.53 g of a polymer was obtained by carrying out polymerization in the same manner as in Example 13, except that instead of 0.3 mmol of triisobutylaluminum and 2 ml (0.4 μmol in terms of zirconium atom calculated from the amount fed during the catalyst preparation) of the catalyst preparation liquid (a14), di(p-tolyl)methylene(cyclopentadienyl)(octamethyloctahydrodibenzofluorenyl)zirconium dichloride (0.4 μmol in terms of zirconium atom calculated from the amount fed during the catalyst preparation), 0.6 μmol of triphenylcarbenium tetrakis(pentafluorophenyl)borate and 0.5 mmol of triisobutylaluminum were each added.

Comparative Example 7

2.22 g of a polymer was obtained by carrying out polymerization in the same manner as in Example 13, except that instead of 2 ml (0.4 μmol in terms of zirconium atom calculated from the amount fed during the catalyst preparation) of the catalyst preparation liquid (a14), 0.4 ml (0.4 μmol in terms of zirconium atom calculated from the amount fed during the catalyst preparation) of the catalyst preparation liquid (a17) was added.

Example 15

3.82 g of a polymer was obtained by carrying out polymerization in the same manner as in Example 13, except that instead of 2 ml (0.4 μmol in terms of zirconium atom) of the catalyst preparation liquid (a14), 16 ml (0.4 μmol in terms of zirconium atom) of a solution prepared by diluting 5 ml of the catalyst preparation liquid (a14) with 35 ml of hexane was added.

Comparative Example 8

0.65 g of a polymer was obtained by carrying out polymerization in the same manner as in Example 13, except that instead of 0.3 mmol of triisobutylaluminum and 2 ml (0.4 μmol in terms of zirconium atom calculated from the amount fed during the catalyst preparation) of the catalyst preparation liquid (a14), 0.46 mmol of triisobutylaluminum and 16 ml (0.4 μmol in terms of zirconium atom calculated from the amount fed during the catalyst preparation) of the catalyst preparation liquid (a20) were added.

Example 16

In a glass autoclave having an internal volume of 500 ml and having been thoroughly purged with nitrogen, 300 ml of heptane was introduced, then 10 ml of 1-octene was introduced, and with passing ethylene at a rate of 60 L/h, the temperature was set at 40° C. To the system, 0.3 mmol of triisobutylaluminum and 4 ml (0.4 μmol in terms of zirconium atom calculated from the amount fed during the catalyst preparation) of the catalyst preparation liquid (a23) were added, and the number of rotations for stirring was set to 650 rpm, whereby polymerization was initiated. During the polymerization, ethylene was continuously fed at a rate of 60 L/h, and the polymerization was carried out for 5 minutes. Thereafter, a small amount of methanol was added to terminate the polymerization. The polymer solution was added to a large excess of methanol to precipitate a polymer, and the polymer was subjected to vacuum drying at 80° C. for 12 hours. As a result, 5.59 g of a polymer was obtained.

Comparative Example 9

5.44 g of a polymer was obtained by carrying out polymerization in the same manner as in Example 16, except that instead of 4 ml (0.4 μmol in terms of zirconium atom) of the catalyst preparation liquid (a23), 4 ml (0.4 μmol in terms of zirconium atom) of the catalyst preparation liquid (a24) was added.

TABLE 6

|  | Catalyst | Amount of (A) added based on 1 L of (D) mmol/L | Component (A) μmol | Molar ratio (B)/(A) | Yield g | Catalytic activity kg/mmol-Zr |
|---|---|---|---|---|---|---|
| Ex. 13 | catalyst preparation liquid a14 | 0.2 | 0.4 | 1.5 | 3.74 | 9.4 |
| Ex. 14 | catalyst preparation liquid a15 | 0.2 | 0.4 | 1.5 | 3.69 | 9.2 |
| Comp. Ex. 6 | successive addition of components | — | 0.4 | 1.5 | 0.53 | 1.3 |
| Comp. Ex. 7 | catalyst preparation liquid a17 | 1 | 0.4 | 1.5 | 2.22 | 5.6 |
| Ex. 15 | catalyst preparation liquid a14 *2 | 0.025 | 0.4 | 1.5 | 3.82 | 9.6 |
| Comp. Ex. 8 | catalyst preparation liquid a20 | 0.025 | 0.4 | 1.5 | 0.65 | 1.6 |
| Ex. 16 | catalyst preparation liquid a23 | 0.1 | 0.4 | 15 | 5.59 | 14.0 |
| Comp. Ex. 9 | catalyst preparation liquid a24 | 0.1 | 0.4 | 30 | 5.44 | 13.6 |

*2: A solution obtained by diluting the catalyst preparation liquid a13 8 times was used.

From the catalyst preparation liquids (a12) to (a24) and the results of Examples 13 to 16 and Comparative Examples 6 to 9, the following have been found.

In the catalyst preparation liquid (a12), the amount of the metallocene compound (A) added to 1 liter of the saturated hydrocarbon solvent (D) was not more than the lower limit of the condition (i), and therefore, a solid remaining undissolved, which seemed to be the component (B), was observed in the catalyst preparation liquid.

In the catalyst preparation liquid (a17), the amount of the metallocene compound (A) added to 1 liter of the saturated hydrocarbon solvent (D) was not less than the upper limit of the condition (i), and therefore, precipitation of a solid which seemed to be an active species was observed in this catalyst preparation liquid. Since the active species was precipitated, the polymerization activity of Comparative Example 7 using the catalyst preparation liquid (a17) in the polymerization was lower than that of Example 13 using the catalyst preparation liquid (a14).

In the catalyst preparation liquid (a18), the molar ratio (C)/(A) of the component (C) which was an organoaluminum compound to the metallocene compound (A) was not more than the lower limit of the condition (ii), and therefore, a solid remaining undissolved, which seemed to be the component (B), was observed in the catalyst preparation liquid.

In the catalyst preparation liquid (a20), the amount of the component (C) added to 1 liter of the saturated hydrocarbon solvent (D) was not more than the lower limit of the condition (iii), and therefore, a solid remaining undissolved, which seemed to be the component (B), was observed in the catalyst preparation liquid. On this account, the polymerization activity of Comparative Example 8 using the catalyst preparation liquid (a20) in the polymerization was lower than that of Example 13. On the other hand, in Example 15, a solution, in which the amount of the metallocene compound (A) added to 1 liter of the saturated hydrocarbon solvent (D) was made equal to that in the catalyst preparation liquid (a20) by diluting the catalyst preparation liquid (a14) with the saturated hydrocarbon solvent (D), was used in the polymerization, and this example had activity equivalent to that of Example 13.

In the catalyst preparation liquid (a24), the molar ratio ((B)/(A)) of the added compound (B) to the metallocene compound (A) is not less than the upper limit of the condition (iv), and therefore, a solid remaining undissolved, which seemed to be the component (B), was observed in the catalyst preparation liquid. However, it has been confirmed that the activity of Comparative Example 9 using the catalyst preparation liquid (a24) in the polymerization was high. On the other hand, Example 16 using the catalyst preparation liquid (a23) in which the molar ratio (B)(A)) of the added compound (B) to the metallocene compound (A) was within the range of the condition (iv) had activity equivalent to that of Comparative Example 9. From this, it has been confirmed that even if the molar ratio ((6)(A)) of the compound (B) to the metallocene compound (A) is not less than the upper limit of the condition (iv), activity is exhibited provided that a sufficient amount of the compound (B) is dissolved in the saturated hydrocarbon solvent (D).

INDUSTRIAL APPLICABILITY

In the process for producing an olefin polymer of the present invention, preparation of an olefin polymerization catalyst solution has succeeded without using an aromatic hydrocarbon solvent but using a saturated hydrocarbon solvent, such as an aliphatic hydrocarbon solvent or an alicyclic hydrocarbon solvent, as a catalyst component for use in the solution polymerization. By the use of this catalyst solution, polymerization of an olefin can be carried out with high activity while avoiding use of an aromatic hydrocarbon solvent that causes large environmental burden. Moreover, since the catalyst has been dissolved, the active species is homogeneous and can be held in a homogeneous state in the reaction field. Therefore, there occurs no problem that a polymer different from the desired polymer is precipitated and adheres to a polymerization vessel wall or a stirring blade during olefin polymerization, so that long-term continuous operation becomes feasible. Hence, industrial applicability of the production process of the present invention is extremely high.

The invention claimed is:

1. A process for producing an olefin polymer, having a step comprising feeding an olefin polymerization catalyst solution, which is obtained by mixing
   (A) a metallocene compound represented by the general formula [A1] and/or a metallocene compound represented by the general formula [A2],
   (B) a compound which is a compound that reacts with the metallocene compound (A) to form an ion pair, and is represented by the general formula [B1], and
   (C) an organoaluminum compound (C-1) and/or an organoaluminum oxy compound (C-2),
   with (D) a saturated hydrocarbon solvent under the following conditions (i) to (iv),
   to a polymerization reactor and solution-polymerizing an olefin in the polymerization reactor;

(i) the amount of the metallocene compound (A) added to 1 liter of the saturated hydrocarbon solvent (D) is 0.02 to 0.6 mmol, (ii) the molar ratio ((C)/(A)) of an aluminum atom in the compound (C) added to the saturated hydrocarbon solvent (D) to the metallocene compound (A) is 33 to 5000, (iii) the amount of an aluminum atom in the compound (C) added to 1 liter of the saturated hydrocarbon solvent (D) is 3 to 1000 mmol, and (iv) the molar ratio ((B)/(A)) of the compound (B) added to the saturated hydrocarbon solvent (D) to the metallocene compound (A) is 1 to 15;

[Chem. 1]

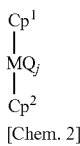

[A1]

[Chem. 2]

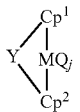

[A2]

wherein, in the formulas [A1] and [A2], M is an atom of the periodic table Group 4 or Group 5, Q is a halogen atom, a hydrocarbon group, a halogenated hydrocarbon group, a neutral conjugated or non-conjugated diene, an anionic ligand or a neutral ligand capable of being coordinated with a lone electron pair, j is an integer of 1 to 4, when j is an integer of 2 or greater, plural Q are the same as or different from each other, and $Cp^1$ and $Cp^2$ are the same as or different from each other and are each a cyclopentadienyl group or a substituted cyclopentadienyl group capable of forming a sandwich structure together with M; and Y in the formula [A2] is a divalent hydrocarbon group of 1 to 30 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^a$—, —P(R$^a$)—, —P(O)(R$^a$)—, —BR$^a$— or —AlR$^a$— wherein R$^a$ is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to a nitrogen atom;

[Chem. 3]

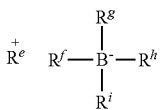

[B1]

wherein, in the formula [B1], R$^{e+}$ is carbenium cation, and R$^f$ to R$^i$ are each independently a hydrocarbon group of 1 to 20 carbon atoms or a halogenated hydrocarbon group of 1 to 20 carbon atoms.

2. The process for producing an olefin polymer as claimed in claim 1, wherein the compound (C) is a compound represented by the general formula [C1]:

[Chem. 4]

AlR$_3$    [C1]

wherein, in the formula [C1], R is a straight-chain or branched alkyl group of 3 to 10 carbon atoms.

3. The process for producing an olefin polymer as claimed in claim 1, wherein the metallocene compound (A) is a compound represented by the general formula [A3]:

[Chem. 5]

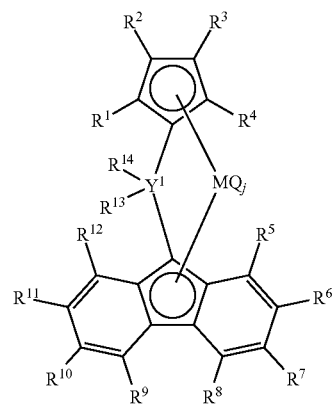

[A3]

wherein, in the formula [A3], R$^1$, R$^2$, R$^3$, R$^4$, R$^5$, R$^8$, R$^9$ and R$^{12}$ are each independently a hydrogen atom, a hydrocarbon group, a silicon-containing group or a hetero atom-containing group other than a silicon-containing group, and neighboring two groups of R$^1$ to R$^4$ are optionally bonded to each other to form a ring;

R$^6$ and R$^{11}$ are the same atoms or the same groups selected from hydrogen atoms, hydrocarbon groups, silicon-containing groups and hetero atom-containing groups other than silicon-containing groups, R$^7$ and R$^{10}$ are the same atoms or the same groups selected from hydrogen atoms, hydrocarbon groups, silicon-containing groups and hetero atom-containing groups other than silicon-containing groups, R$^6$ and R$^7$ are optionally bonded to each other to form a ring, and R$^{10}$ and R$^{11}$ are optionally bonded to each other to form a ring, with the proviso that there is no case where all of R$^6$, R$^7$, R$^{10}$ and R$^{11}$ are hydrogen atoms;

R$^{13}$ and R$^{14}$ are each an alkyl group or an aryl group, and R$^{13}$ and R$^{14}$ are optionally bonded to each other to form a ring;

M is a titanium atom, a zirconium atom or a hafnium atom;

Y$^1$ is a carbon atom or a silicon atom; and

Q is a halogen atom, a hydrocarbon group, a halogenated hydrocarbon group, a neutral conjugated or non-conjugated diene of 4 to 20 carbon atoms, an anionic ligand or a neutral ligand capable of being coordinated with a lone electron pair, j is an integer of 1 to 4, or when j is an integer of 2 or greater, plural Q are the same as or different from each other.

4. The process for producing an olefin polymer as claimed in claim 1, wherein the saturated hydrocarbon solvent used in the solution polymerization is an aliphatic hydrocarbon solvent and/or an alicyclic hydrocarbon solvent.

5. The process for producing an olefin polymer as claimed in claim 1, wherein R$^f$ to R$^i$ in the formula [B1] are each independently an aromatic hydrocarbon groups of 6 to 20 carbon atoms or a halogenated aromatic hydrocarbon groups of 6 to 20 carbon atoms.

* * * * *